(12) United States Patent
Watanabe

(10) Patent No.: US 9,404,474 B2
(45) Date of Patent: Aug. 2, 2016

(54) SYSTEM AND METHOD FOR EFFICIENT WIND POWER GENERATION

(75) Inventor: Kahoru Watanabe, Sarasota, FL (US)

(73) Assignee: Wing Power Energy, Inc., Burlington, MA (US)

( * ) Notice: Subject to any disclaimer, the term of this patent is extended or adjusted under 35 U.S.C. 154(b) by 906 days.

(21) Appl. No.: 13/559,580

(22) Filed: Jul. 26, 2012

(65) Prior Publication Data

US 2013/0028742 A1 Jan. 31, 2013

Related U.S. Application Data

(60) Provisional application No. 61/511,744, filed on Jul. 26, 2011.

(51) Int. Cl.
   *F03D 3/06* (2006.01)
   *F03D 3/00* (2006.01)

(52) U.S. Cl.
   CPC ............... *F03D 3/005* (2013.01); *F03D 3/061* (2013.01); *F05B 2240/213* (2013.01); *F05B 2240/214* (2013.01); *F05B 2250/72* (2013.01); *Y02E 10/74* (2013.01)

(58) Field of Classification Search
   CPC ............. Y02E 10/74; F03D 3/02; F03D 3/06; F03D 3/061; F03D 3/062; F03D 9/007; F05B 2240/213; F05B 2240/30; F05B 2240/301
   See application file for complete search history.

(56) References Cited

U.S. PATENT DOCUMENTS

| | | | |
|---|---|---|---|
| 3,706,430 A * | 12/1972 | Kline et al. | 244/35 R |
| 6,974,309 B2 * | 12/2005 | Seki | 416/227 R |
| 7,084,523 B2 * | 8/2006 | Noguchi et al. | 290/55 |
| 8,449,255 B2 * | 5/2013 | Tadayon et al. | 416/37 |
| 2007/0134094 A1 * | 6/2007 | Gregory | 416/87 |
| 2007/0224029 A1 * | 9/2007 | Yokoi | 415/4.2 |
| 2008/0047270 A1 * | 2/2008 | Gilbert | 60/641.12 |
| 2008/0256795 A1 * | 10/2008 | Edwards | 29/889.21 |
| 2008/0273978 A1 * | 11/2008 | Watkins | 416/197 A |
| 2009/0290972 A1 * | 11/2009 | Farb | 415/4.3 |
| 2011/0042962 A1 * | 2/2011 | Yoon | 290/55 |
| 2011/0116926 A1 * | 5/2011 | Fox et al. | 416/13 |
| 2011/0142659 A1 * | 6/2011 | Janiuk | 416/223 R |

(Continued)

FOREIGN PATENT DOCUMENTS

| | | |
|---|---|---|
| DE | 3626917 A1 | 12/1987 |
| DE | 19502428 A1 | 8/1996 |

(Continued)

OTHER PUBLICATIONS

International Search Report and Written Opinion issued for PCT/US2012/048424, mailed Oct. 23, 2012, 12 pages.

*Primary Examiner* — Dwayne J White
*Assistant Examiner* — Joshua R Beebe
(74) *Attorney, Agent, or Firm* — Chapin IP Law, LLC

(57) ABSTRACT

A system and method for efficient wind power generation is provided. The system includes a shaft that rotates around a vertical axis, a plurality of blades, and a plurality of arms that couple the blades to the shaft. The blades are configured to have a rounded, symmetrical design which minimizes the effects of lift. The blades are also configured to include a notched portion for capturing wind and using it to propel the blades. The blades may also be configured to include winglets, which reduce vortex shedding, drag, and noise, and could also reduce friction on the bearings caused by gravity.

18 Claims, 24 Drawing Sheets

(56) References Cited

U.S. PATENT DOCUMENTS

2011/0171025 A1* 7/2011 Levine et al. ............... 416/1
2012/0003092 A1* 1/2012 Yan et al. ................. 416/100
2013/0315703 A1* 11/2013 Dacus et al. ............... 415/4.4

FOREIGN PATENT DOCUMENTS

DE        202008006801 U1    3/2009
WO      WO-2011/075833 A1    6/2011

* cited by examiner

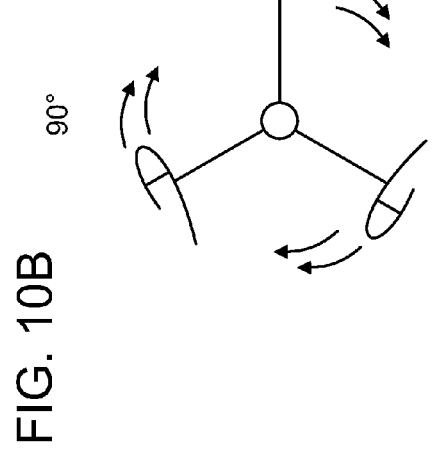
FIG. 10B 90°
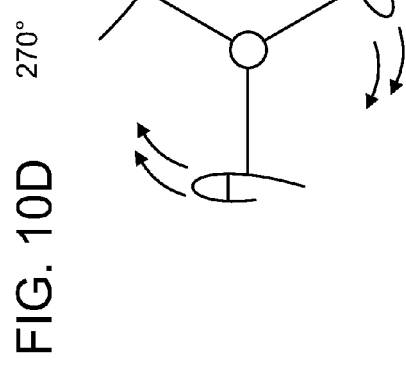
FIG. 10D 270°
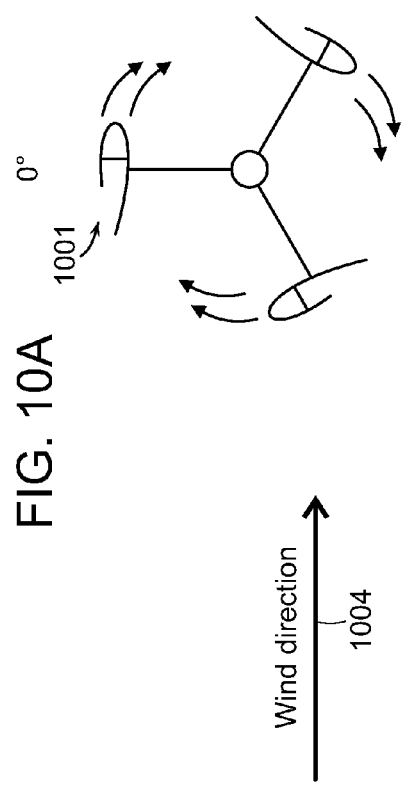
FIG. 10A 0°
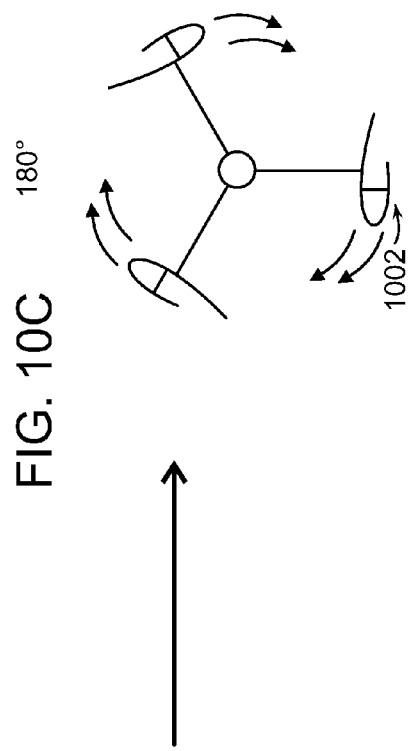
FIG. 10C 180°
Wind direction 1004

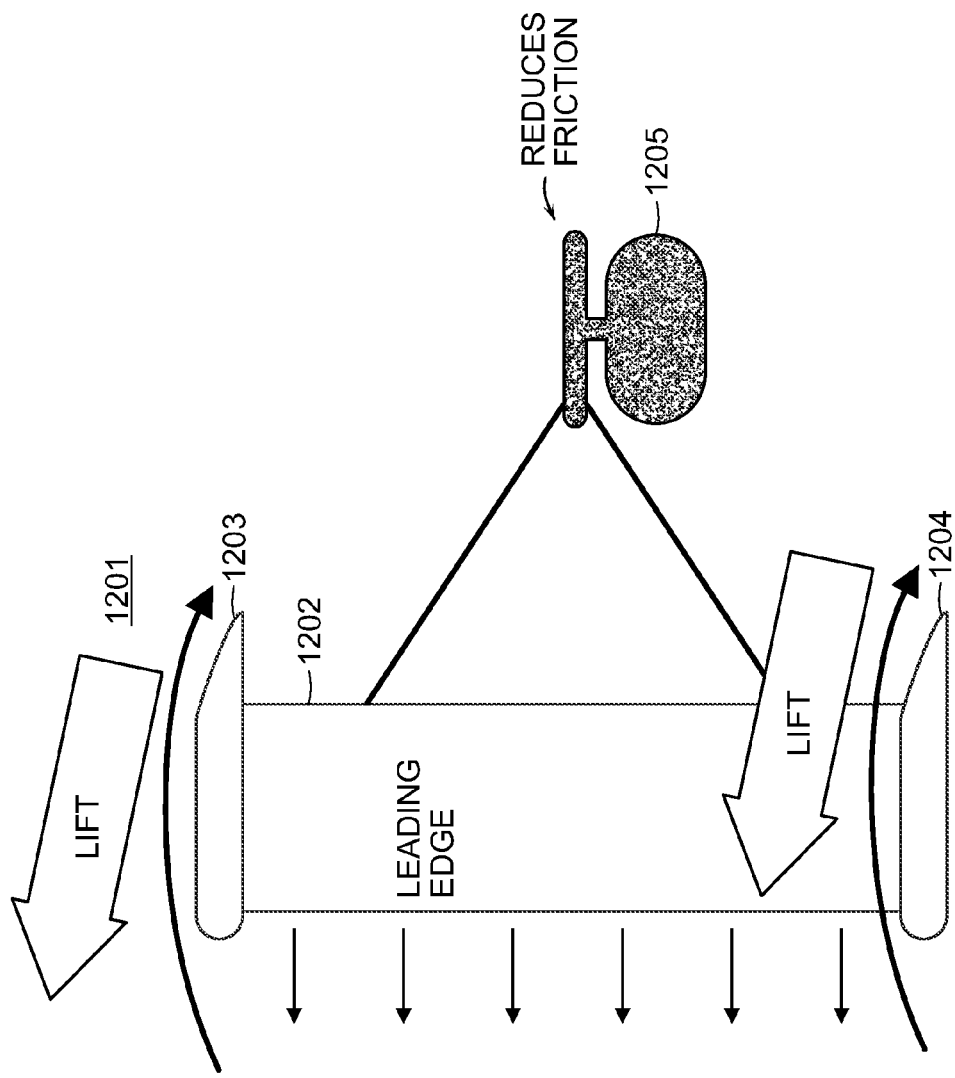

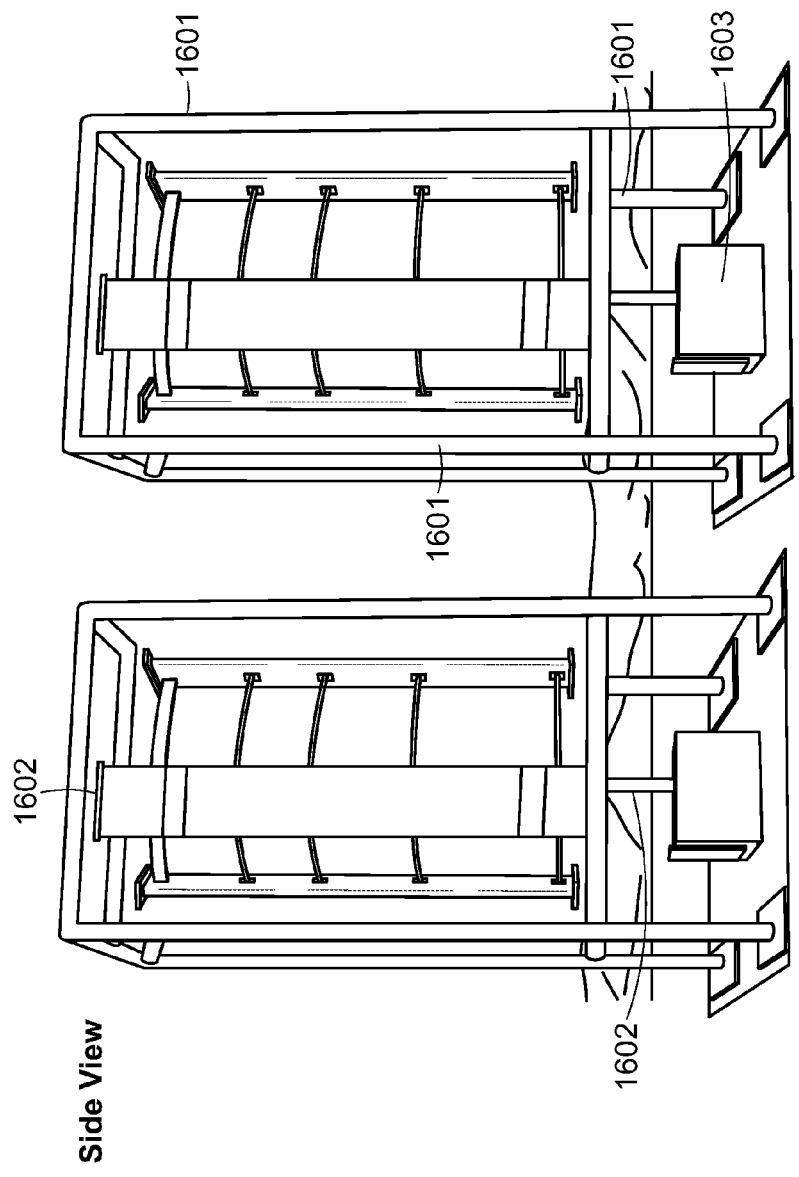
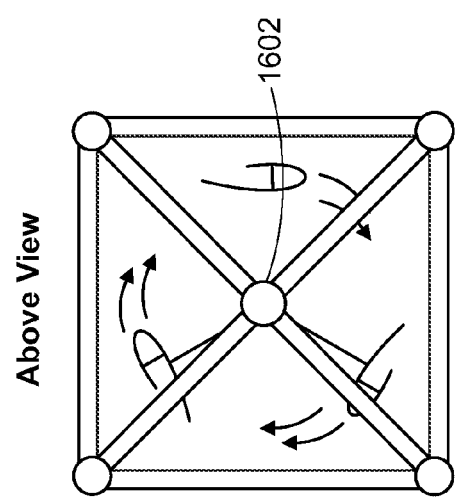

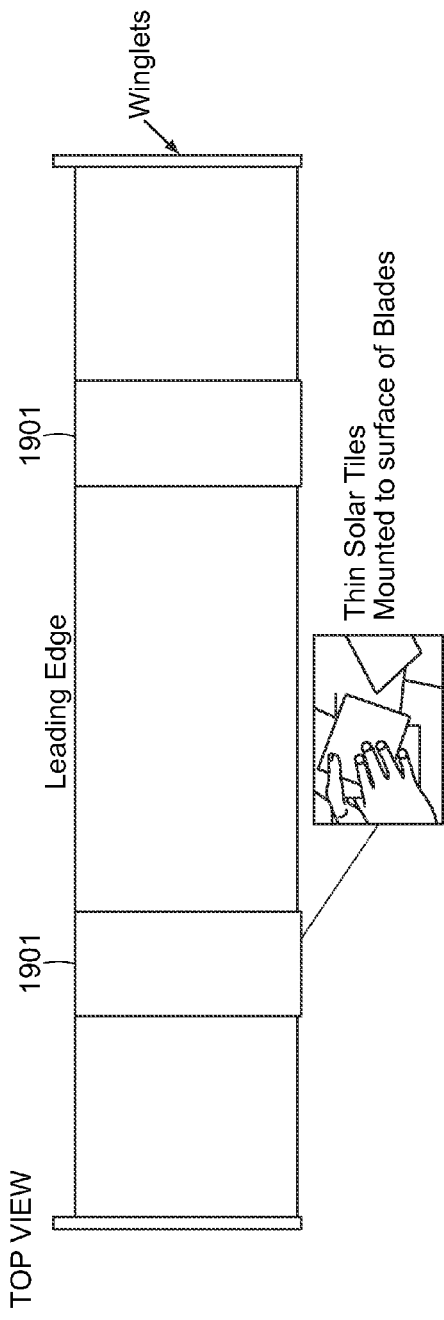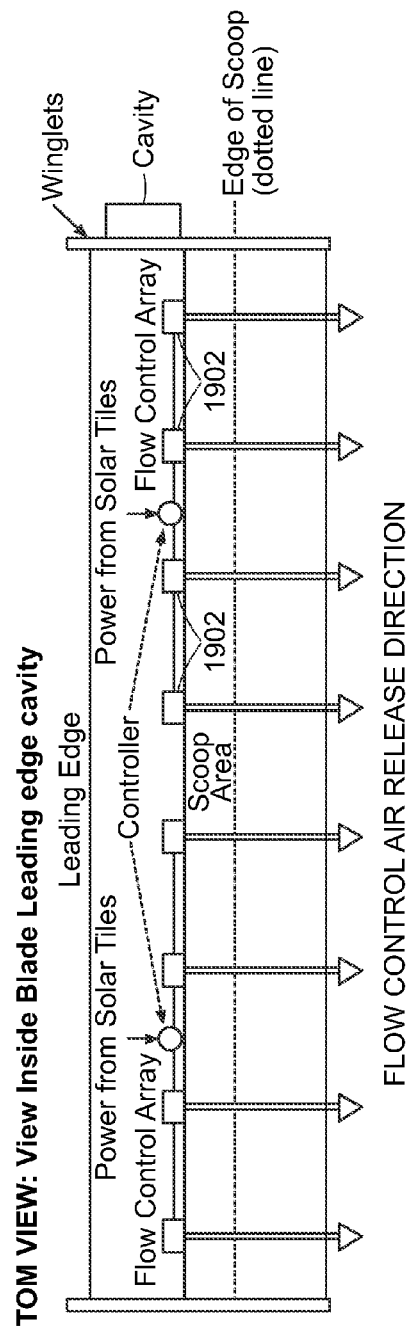
FIG. 19A FLOW CONTROL CONCEPT: Solar Powered TOP VIEW
FIG. 19B BOTTOM VIEW: View Inside Blade Leading edge cavity

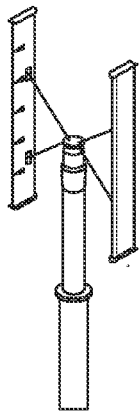
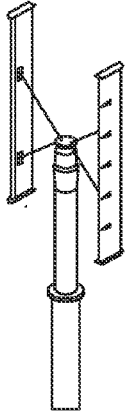
2 Blade Configurations
FIG. 24A
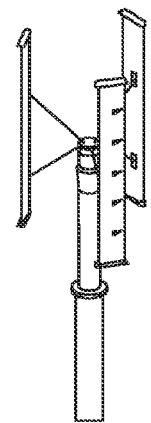
3 Blade Configurations
FIG. 24B
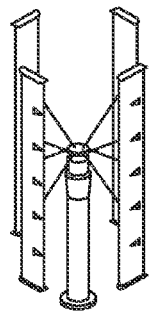
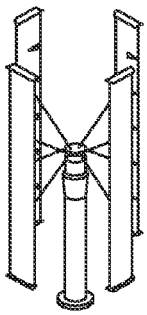
4 Blade Configurations
FIG. 24C
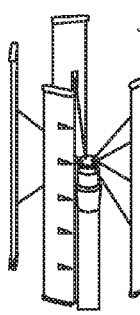
5 Blade Configurations
FIG. 24D

SYSTEM AND METHOD FOR EFFICIENT WIND POWER GENERATION

CROSS REFERENCE TO RELATED APPLICATION

This application claims priority under 35 U.S.C. §119(e) to U.S. Provisional Application Ser. No. 61/511,744, filed on Jul. 26, 2011, which is hereby incorporated by reference herein in its entirety.

FIELD OF INVENTION

The present invention relates to systems and methods for efficient wind power generation. More specifically, the system and method of the present invention are directed to utilizing blades that are specifically designed to increase the efficiencies of a windmill with changes in various wind conditions.

BACKGROUND OF THE INVENTION

The energy crisis caused a considerable growth of interest in alternative sources of energy in the past few years. Among the several energy sources being explored, wind energy, which is a form of solar energy, became a significant energy source. If the efficiency of a windmill can be increased, the cost of wind energy will be reduced together with the dependency on expensive, polluting power generators.

There are two types or configurations of windmills used for wind power generation: horizontal axis wind turbines (HAWT) and vertical axis wind turbines (VAWT). HAWTs spin on a horizontal axis and are the more common design of the two turbine designs. However, HAWTs are not as efficient as VAWTs because they must be adjusted so that their blades can capture the wind. In contrast, VAWTs, which spin on a vertical axis, can capture wind regardless of the direction it is blowing, and therefore can process wind energy more efficiently. Furthermore, generators and gearboxes for the VAWTs can be placed on the ground, which makes them much more accessible for maintenance.

As shown in FIGS. 1A, 2A, and 3A, there are existing VAWT designs, such as the design described in U.S. Pat. No. 7,084,523 to Noguchi ("Noguchi"). However, these VAWT designs are based on the Bernoulli principle and suffer from several inefficiencies. Bernoulli's principle relies on the asymmetrical shape of an airfoil to cause air to flow over the top and bottom surfaces of the airfoil at different speeds. The variations in speeds result in different pressures at the top and bottom surfaces of the airfoil, which induces varying forces such as lift, as shown in FIG. 1A. Bernoulli-based designs, such as Noguchi, rely on this induced lift component to increase forward momentum of the blades in perpetuity. For example, Noguchi repeatedly states that the blade should have a "high lift coefficient". Furthermore, Noguchi attaches its blades to the main shaft at a slight angle 201 from the plane of rotation, 202, as shown in FIG. 2A. This offset induces additional lift that can be used to drive the blades.

While a component of the induced lift does help propel the blades, it also creates a significant number of other problems. For example, there is an outward component of the induced lift that is orthogonal to, and away from, the center of rotation. This orthogonal component pulls the blades away from the center, which causes the blades to try to "lift off" from the center of rotation as shown in FIG. 3A, and creates significant resistance thereby slowing down rotation. The orthogonal lift component also creates stresses on the blades and friction between the bearings and shaft, by constantly pulling the blades outward during rotation. This increased resistance and stress caused by the asymmetrical shape of Noguchi and other Bernoulli-based designs significantly decreases the performance, and the life, and of the windmill.

The shape of windmill blades highly influences their rotation and energy conversion efficiency. As a new generation of companies are now developing on a VAWT platform, there is a need for an optimum blade shape that can increase the overall efficiency and productivity of the windmill, resulting in a lower cost per kilo-watt hour of energy produced.

SUMMARY OF THE INVENTION

A system and method for efficient wind power generation is provided. The system includes a shaft that rotates about a vertical axis, a plurality of blades, and a plurality of arms that connect the blades to the rotating shaft. According to the system of the present invention, the plurality of blades have a symmetrical shape and are positioned vertically around the circumference of the rotating shaft. The symmetrical shape of each blade allows for substantially equal distribution of air across the surfaces of the blade so that there is no substantial variation in pressure on either the top or bottom surface of the blade. By maintaining substantially similar pressures on both surfaces of the blade, the blade design is able to minimize the effects of lift, and reduce the resistance that results from generated lift. Each blade also includes a notched portion formed in either the top surface or bottom surface of the blade for capturing wind to further propel the blades.

Further, the system of the present invention includes at least one winglet on one and/or both ends of the blade. The winglet helps to reduce vortex shedding, drag, and noise. The winglet may also have an asymmetrical design in order to create a lift component parallel to the axis of the rotating shaft that helps to reduce resistance caused by gravity.

Yet further, the system of the present invention is configured to have the notched portion facing outward from the rotating shaft.

Further, the blades of the present invention can be configured to include solar panels or flow control actuators.

The system of the present invention can also include a hydraulic rotating shaft and hydraulic arm, which can quickly and efficiently erect and collapse the shaft.

The present invention will be described in greater detail in the remainder of the specification and claims, referring to the drawings.

BRIEF DESCRIPTION OF THE DRAWINGS

FIGS. 10A-10D are top views of an illustrative blade assembly as it is driven by the wind in an embodiment of the invention.

FIG. 12 is a schematic view of an illustrative windmill blade with winglets and shows the lift generated by the winglets in accordance with an embodiment of the invention.

FIGS. 16A-16B are side and top schematic views of illustrative Megawatt scaled windmills in accordance with an embodiment of the invention.

FIGS. 19A-19B are top and bottom schematics of an illustrative windmill blade with synthetic jet actuators and solar panels in accordance with an embodiment of the invention.

FIGS. 24A-24D show multiple configurations of windmills with a varying number of blades that have outside or inside facing scoop regions in accordance with several embodiments of the invention.

DETAILED DESCRIPTION OF THE INVENTION

The present invention discloses a windmill design that exhibits high power generation efficiency at low wind speeds. This is accomplished, in part, by an improved shape of a VAWT blade that enables power generation from blade rotation to cut-in at lower wind speeds, and in part by using winglets to reduce turbulent vortex shedding that would otherwise reduce the effective energy conversion efficiency and increase acoustical noise of the windmill. This is particularly important for windmill applications in proximity to commercial or residential premises where noise is undesirable and where physical structures may reduce wind strength.

A blade should maximize the capture of windpower, minimize air resistance and minimize drag so that the blade and associated windmill can efficiently rotate and generate power. In an embodiment of the invention, a windmill incorporates a hybrid blade design that combines the properties of a scoop type (Savonius) windmill and properties of a high-efficiency type (Darrieus) windmill with the a more streamlined blade design. This design will be able to take advantage of wind at any speed and in any direction.

Figure 1B:
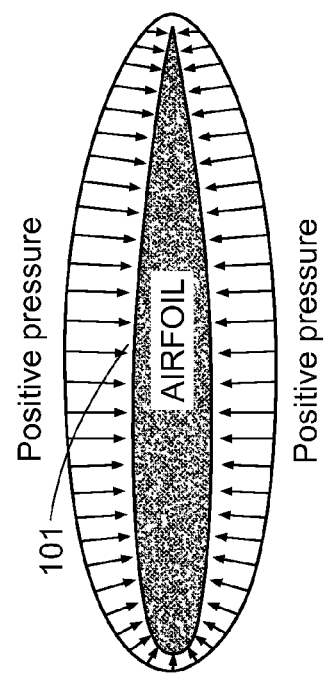
FIGS. 1A-1B show a comparison of blade pressure characteristics on a vertical cross-section of a prior art windmill blade and an illustrative windmill blade in accordance with an embodiment of the invention.
Figure 1A:
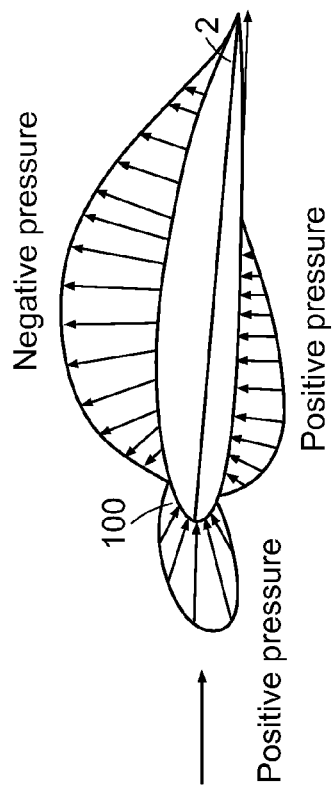
Figure 2B:
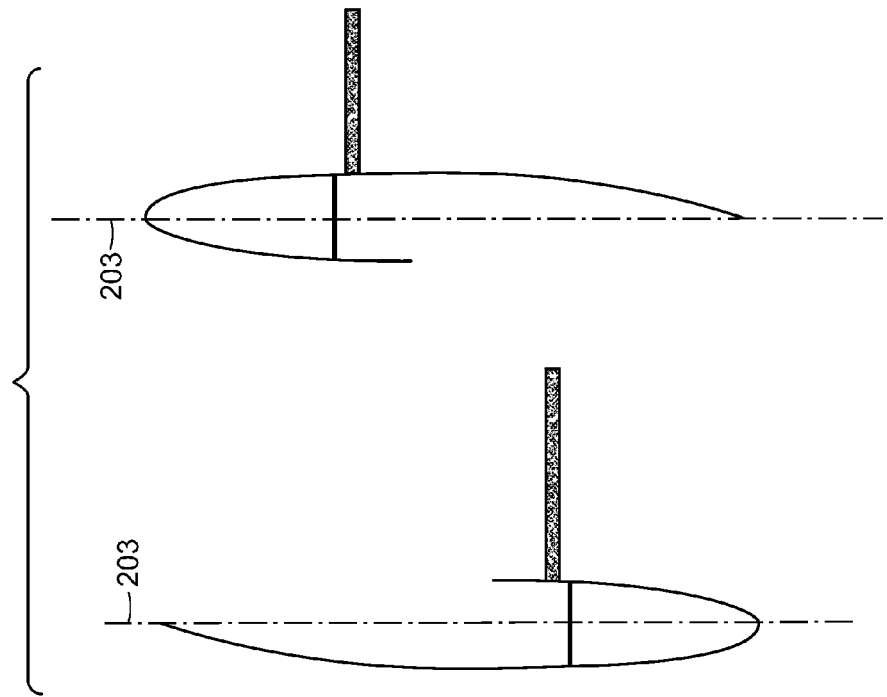
FIGS. 2A-2B are vertical cross-sectional views that compare the shape and angle of attack of a prior art windmill blade and an illustrative windmill place in accordance with an embodiment of the invention.

As shown in the Figures, the preferred embodiment of the invention includes blades that have a symmetrical shape along the width and height of the blades. Unlike Bernoulli-based designs, a symmetrical blade design allows for air to flow across the top and bottom of the blade at similar speeds, which results in similar pressures at the top and bottom of the blade, as shown in FIG. 1B. This equal pressure profile is in stark contrast to the varying pressure profile that is characteristic of a Bernoulli-based design, as shown in FIG. 1A. This is a significant improvement over the Bernoulli-based design because lift is now minimized rather than induced. Lift is further minimized by centering the shape of the blade along the blades longitudinal axis, as shown in FIG. 2B. Bernoulli-based designs, like the design shown in FIG. 2A, purposefully offset the blade from the main shaft at a slight angle to the plane of rotation in order to further enhance lift. In order to minimize lift that is orthogonal to the center of rotation, the preferred embodiment is parallel to the plane of rotation to minimize the lift away from the center of rotation, as shown in FIG. 2B.

Figure 3B:
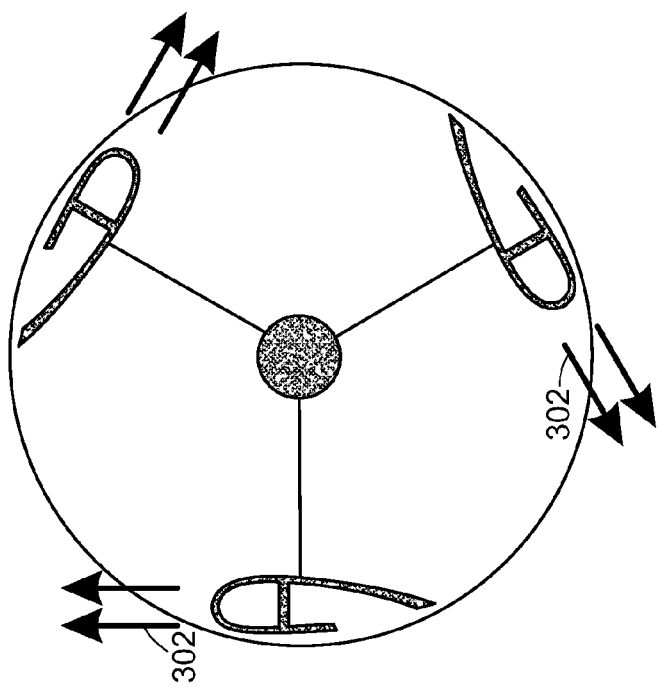
FIGS. 3A-3B is a top view comparing the difference in rotational pull between a prior art windmill blade and an illustrative windmill blade in accordance with embodiments of the invention.
Figure 3A:
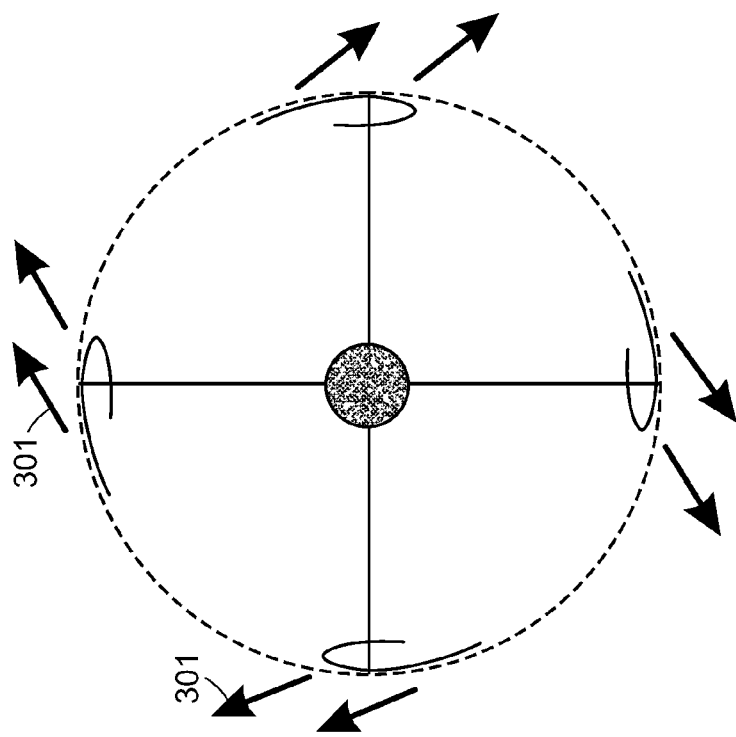

When lift is minimized, as in the preferred embodiment, then forces of rotation are only pulling the blades, as shown in FIG. 3B, and the blades are not subject to lift forces that pull the blades away from the center of rotation, as shown in FIG. 3A. As a result, resistance away from the center of rotation is minimized, which equates to more of the energy being directed towards the rotation of the system so that inertia is sustained for a longer period of time. Another advantage to the symmetrical design is that minimizing lift also reduces countervailing torques acting on the shaft. This in turn reduces rotational friction in the bearing, which lowers the windspeed at which the windmill starts to rotate and increases the energy conversion efficiency. This equates to lower wind condition start up speeds, lower cut-in speeds and faster acceleration for rotation. One of ordinary skill in the art would understand the term "cut-in speed" to mean the wind speed at which usable power can be generated.

Figure 4:
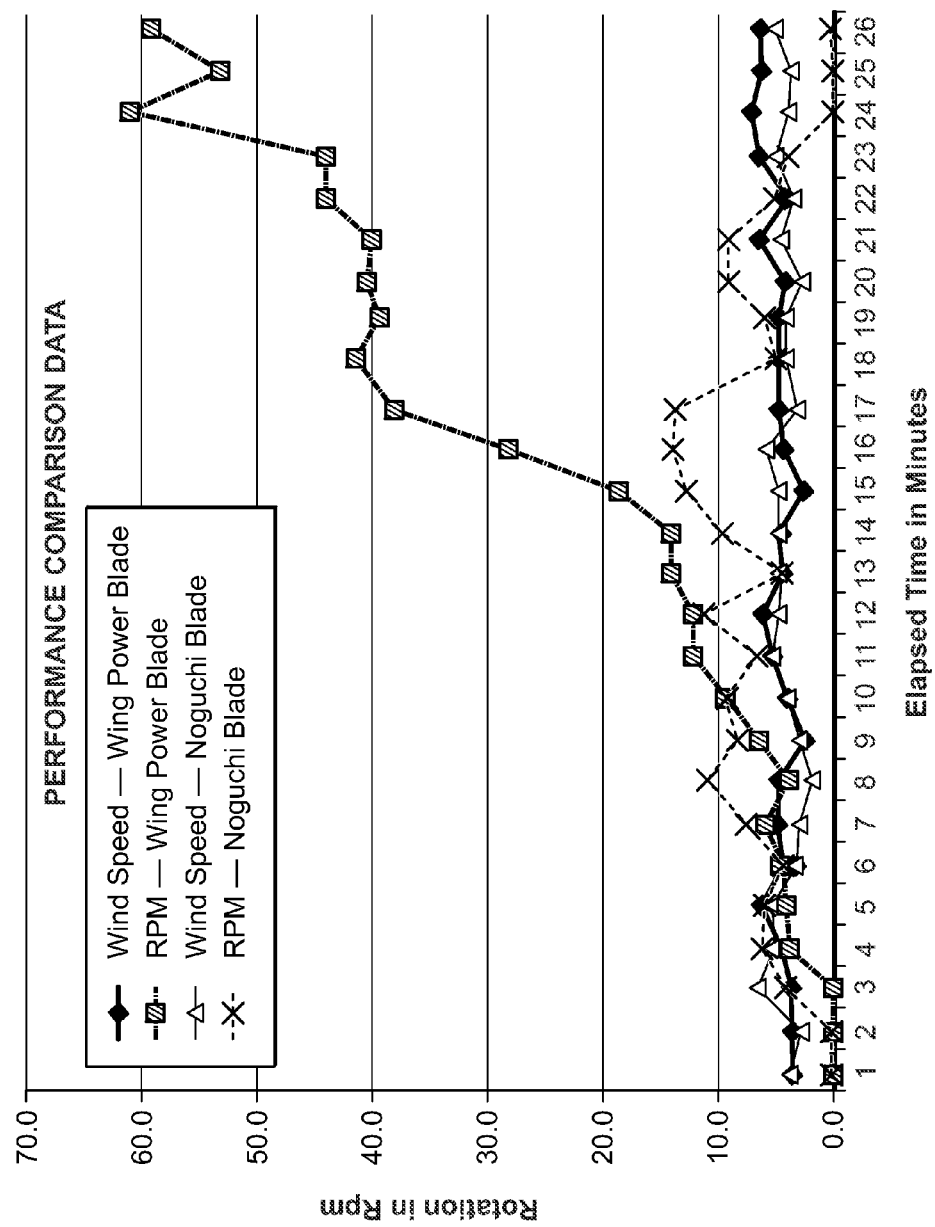
FIG. 4 is a graph comparing the shaft rotational speed (RPM) of a prior art windmill blade over time (minutes) with the shaft rotational speed or an illustrative windmill blade in accordance with an embodiment of the invention over time.
Figure 5:
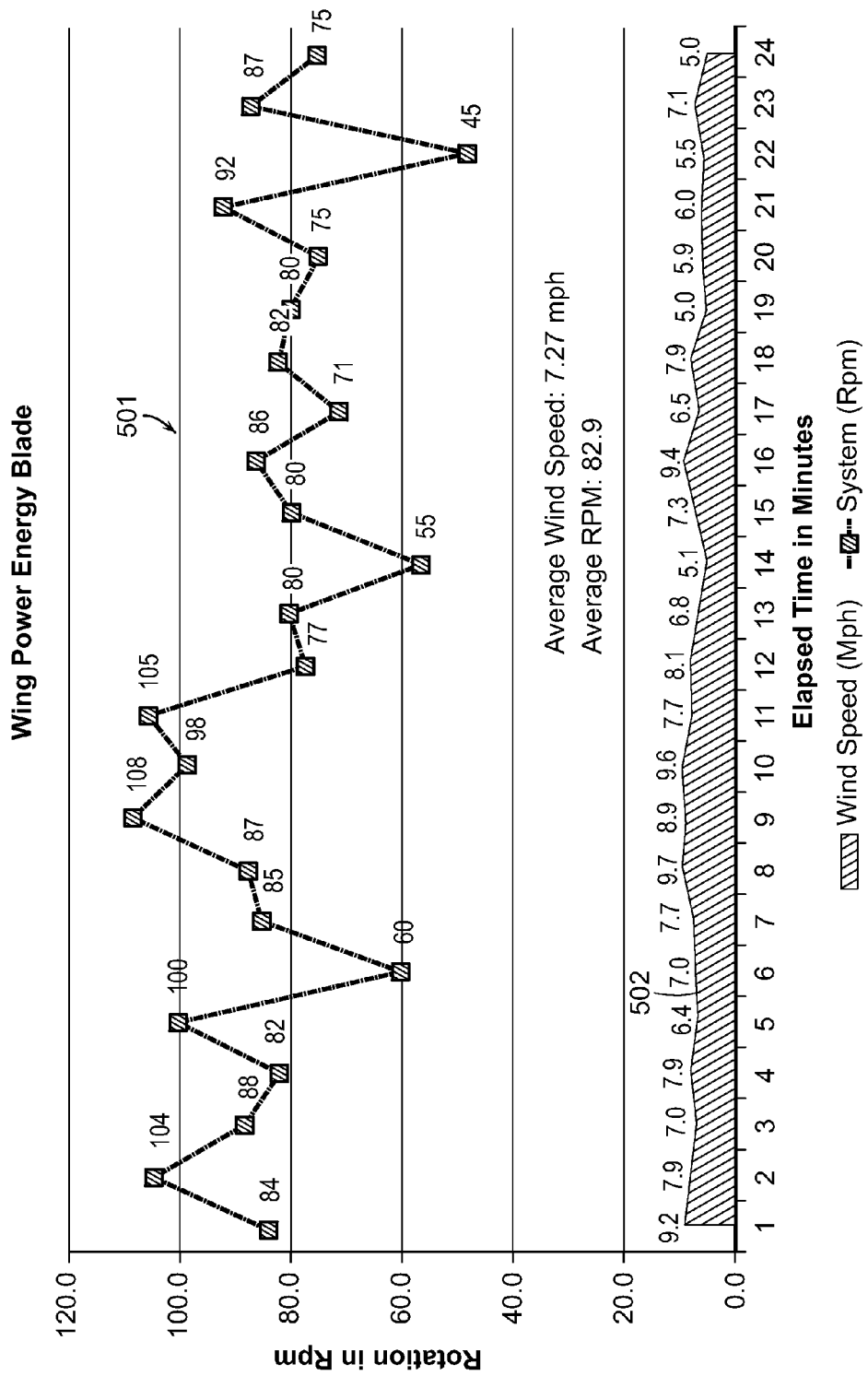
FIG. 5 is a graph comparing the shaft rotational speed (RPM) of an illustrative windmill blade in accordance with an embodiment of the invention over time (minutes) and varying wind speeds (mph).
Figure 6:
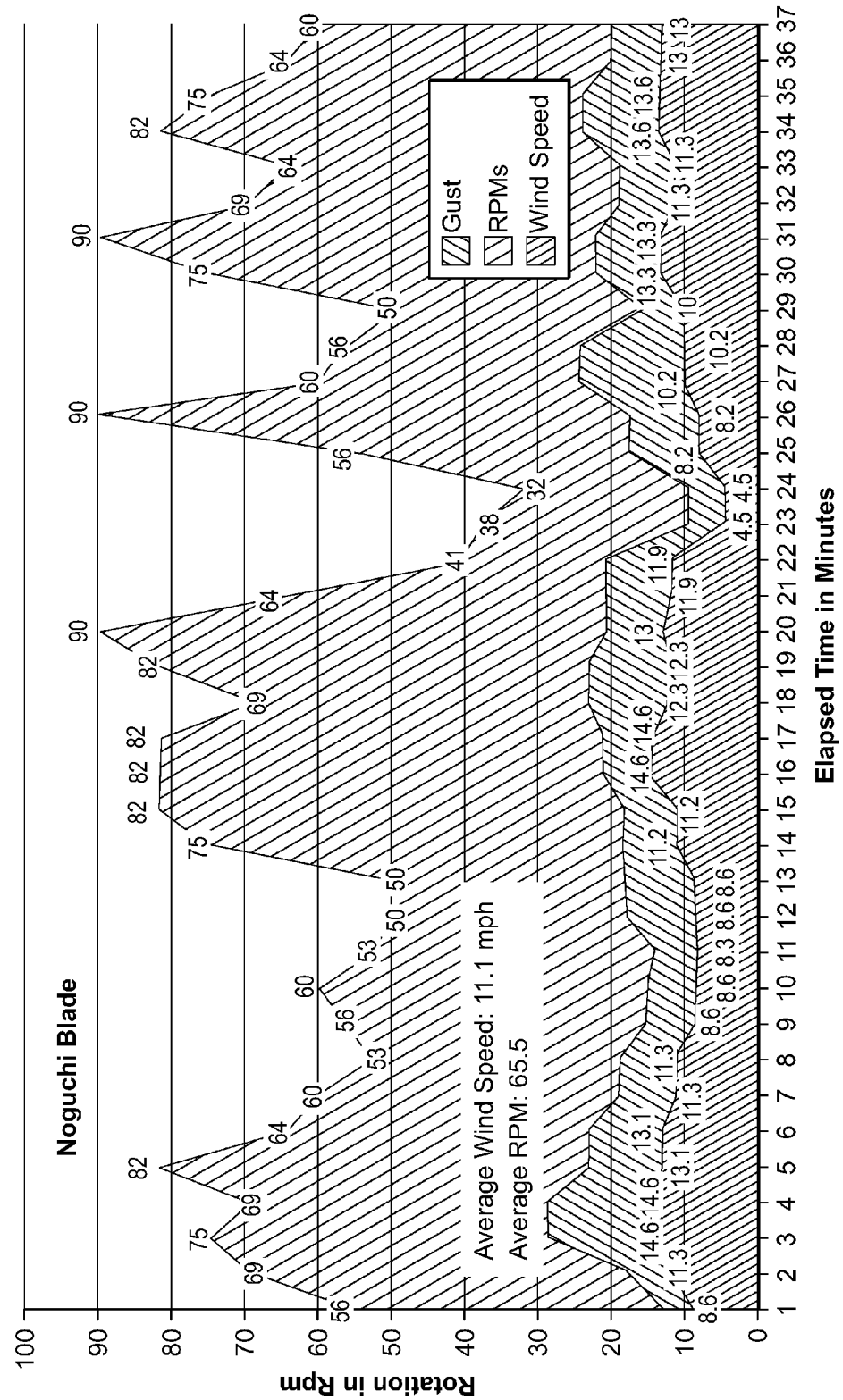
FIG. 6 is a graph comparing the shaft rotational speed (RPM) of a prior art windmill blade in accordance with an embodiment of the invention over time (minutes) and varying wind speeds (mph).

A test was conducted over several weeks on the symmetric design of the preferred embodiment of the invention and on the asymmetric Noguchi blades. This study collected both real-time 24/7 video and an anemometer to measure minute by minute wind data. The video data was played back in slow motion to count the RPM, and the wind data was broken down by anemometer compatible software. By matching the time stamps of the wind data and video, the real time rotation of both systems was able to be accurately matched to its equivalent wind speed. The tests were conducted in the same location using the same tower, which was set on an 8 meter height using the same generator and same length axles. The blades were the same exact length, height, and width to produce identical conditions. FIG. 4 shows the results of that study, which shows that an embodiment of the invention was much more efficient in outputting significantly higher RPMs than the Noguchi system over a span of time when windspeed was generally similar. FIGS. 5 and 6 provide further support for the comparative study. FIG. 5 shows the RPM of an embodiment of the invention over time in response to variable wind speed. Based on the figure, the average RPM for an embodiment of the present invention was 82.9 RPM in response to an average windspeed of 7.27 mph. In contrast, FIG. 6 shows the average RPM over time for the Noguchi system in response to variable wind speed, and the disparity in RPMs is apparent. Specifically, FIG. 6 shows that the average RPM for the Noguchi blades was 65.5 RPM in response to an average windspeed of 11.1 mph. Thus, Noguchi had a much higher wind speed and yet its system had a significantly lower average RPM.

This study helped to establish two points. First, the symmetrical design on average had an improved rotation start time in comparison to the Noguchi design. Second, the symmetrical blade had a much faster rotation than the Noguchi blade at similar wind speeds. In fact, the symmetrical blade's RPM nearly doubled the Noguchi blade's RPM at the same wind speeds. These points helped to prove that minimizing lift, resistance, and stress by using a symmetrical blade greatly enhances the efficiency of a wind turbine in comparison to a Bernoulli-based asymmetrical design.

In an embodiment of the invention, each blade includes a notch portion that is formed at a rear end portion of a lower face of the blade. One of ordinary skill in the art would recognize that the notch portion could be formed anywhere along the face of the blade. The notch "opening" acts as a scoop (e.g., Savonius type) to capture wind. As the wind collides with the interior of the scoop it pushes against the scoop, creating forward momentum which pushes the blade forward. This Savonius-based system allows the windmill to start up faster in lower wind conditions than a pure Darrieus system, which is unable to capture the direct force of the wind. As a result, this Savonius-based system is much more efficient in responding to sudden changes in wind strength by taking advantage of brief but powerful gusts of air.

In an embodiment of the invention, each blade includes winglets on one or both sides. A winglet reduces turbulent vortex shedding, which consequently reduces aerodynamic drag and noise. As a windmill's blades rotate and cut through the wind, an unsteady separation of airflow over the blade can cause swirling vortices at the end of the blade. By adding a winglet to the end of the blade, it reduces these swirling vortices and channels the wind flow. This is important as swirling vortices also create drag, which create resistance and work against the rotation, slowing the windmill down. Furthermore, reducing the swirling vortices, along with the turbulence and drag that is caused by them, also reduces noise. The less the noise the system produces, the more efficiently the blades are moving through the air.

In an embodiment, the winglets are shaped as an airfoil to create some vertical lift, parallel to the axis of rotation. This vertical lift exerts an upward force on the shaft, which reduces bearing friction caused by gravity, and allows for a greater energy efficiency and lower cut-in speed for the windmill.

Figure 7:
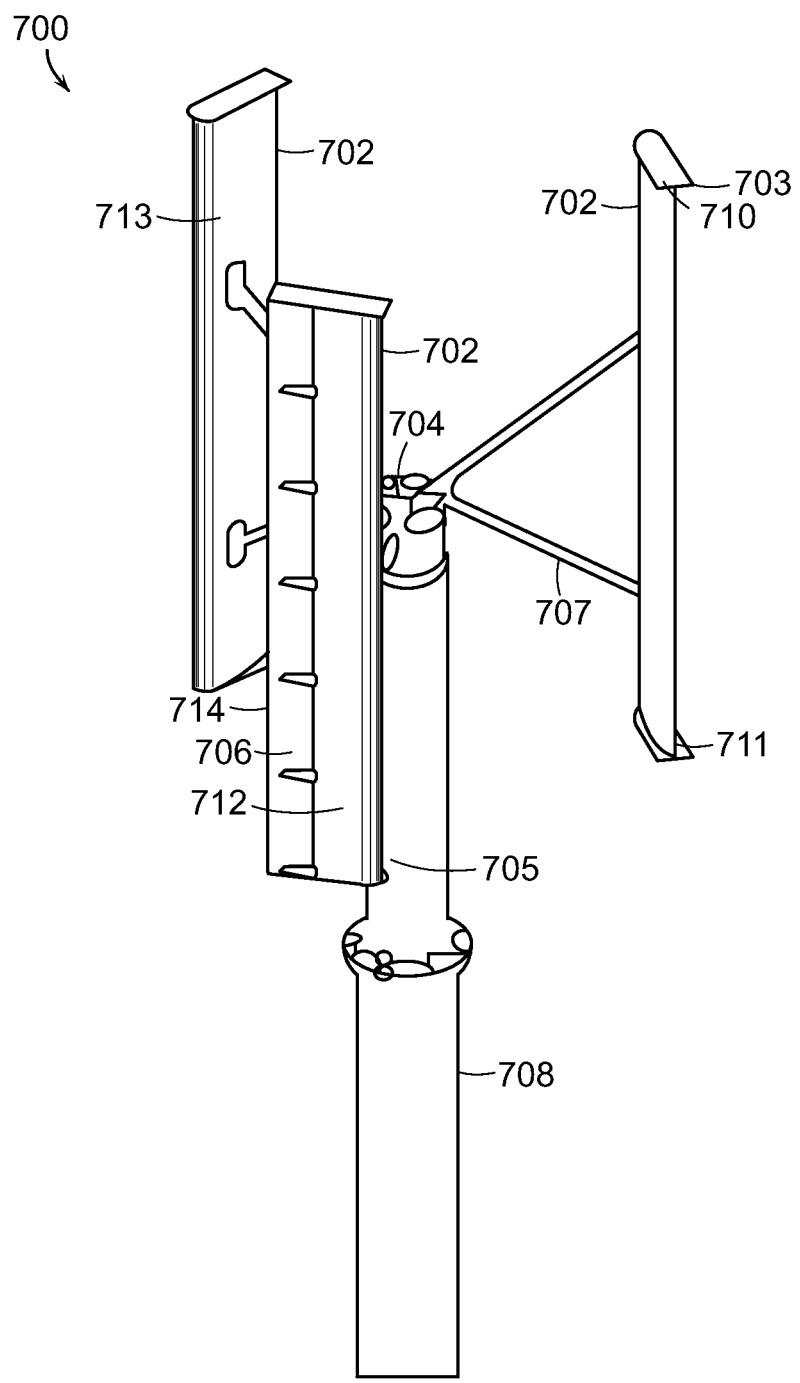
FIG. 7 is an illustrative windmill design in accordance with an embodiment of the invention.
Figure 8A:
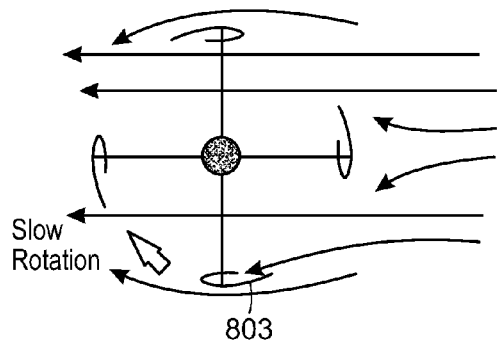
FIGS. 8A-8D are top schematic views showing air flow through various embodiments of the invention.
Figure 8B:
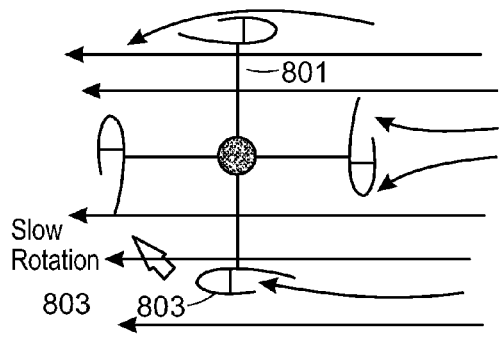
Figure 8C:
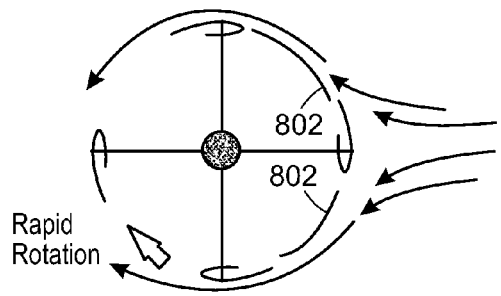
Figure 8D:
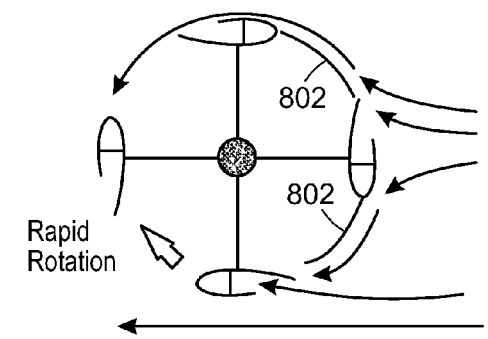

FIG. 7 illustrates a windmill configuration 700 in accordance with an embodiment of the invention. Several blades 702 are attached by spars 707 to a hub 704 and vertical rotating shaft 708. Each blade 702 has a first end 710 and second end 711 connected by a top surface 712 and bottom surface 713 that terminates at a rounded front edge 705 and rear edge 714. The front edge 705 of the blade rotates in the wind while the opposite facing surface of the blade forms a scoop 706 acting to catch the wind's force. Blade 105 is preferably capped by a pair of winglets 703 acting to reduce turbulent vortex shedding. FIGS. 8A-D show that by having the scoop 803 facing the outside of the center of rotation, in a configuration in which there are multiple blades and the system is rotating at higher speeds, the scoop 803 facing outside and away from the center of rotation 801 minimizes the effects of blockage 802. Blockage occurs when the blades are rotating so quickly that the wind sees a wall and goes around the circulation of the blades instead of going through the gap between the blades. In FIGS. 8A and 8B, blockage does not have a significant effect because the blades are rotating slowly. In FIGS. 8C-8D however, the blades are rotating quickly, so a wall is more likely to be created. When this happens, blockage plays a significant effect when the air cant flow between the blades and into the inward facing scoop 803 shown in FIG. 8C. The outward facing scoop 803 shown in 8D is more conducive to rotation because it can still capture air flow even when the air cannot flow between the blades. Accordingly, the preferred embodiment of the invention utilizes outward facing scoops. However, one of ordinary skill in the art would recognize that inward facing scoops could also be used, especially when fewer blades are present or during low wind conditions. FIG. 8 shows the blades with inside and outside scoop configurations, and although four blades are depicted, the system is capable of functioning with more or fewer blades.

Figure 2A:
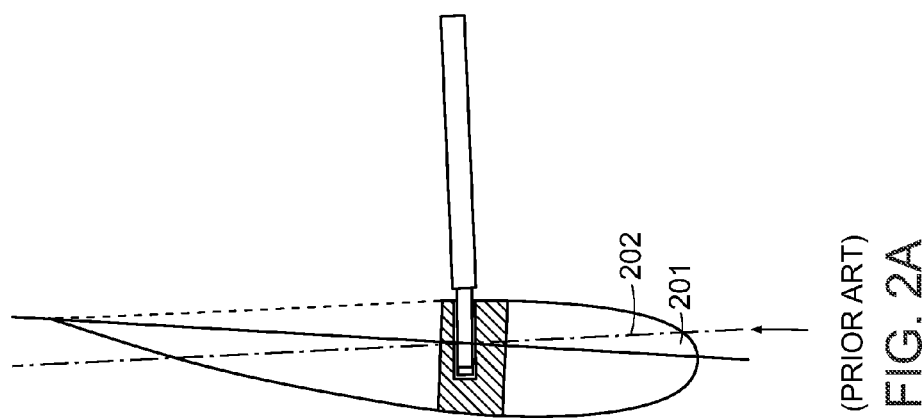
Figure 9B:
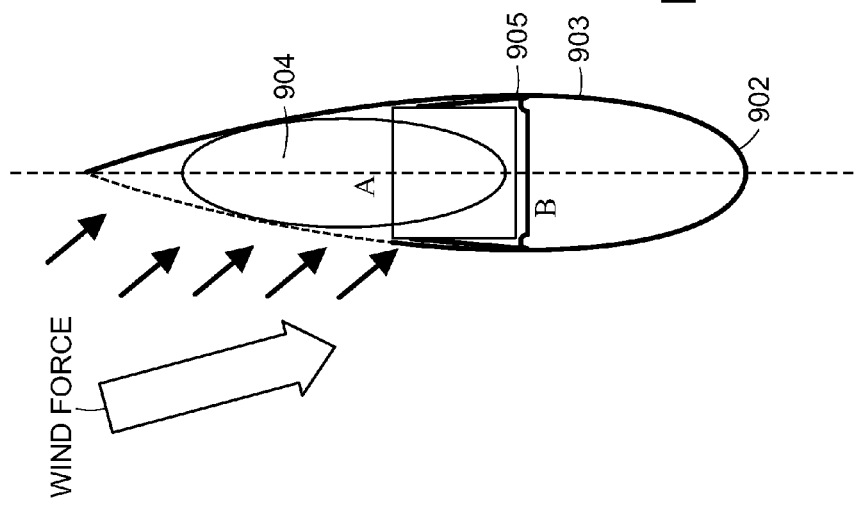
FIGS. 9A-9B are vertical cross-sectional views of an illustrative windmill blade in accordance with embodiments of the invention.
Figure 9A:
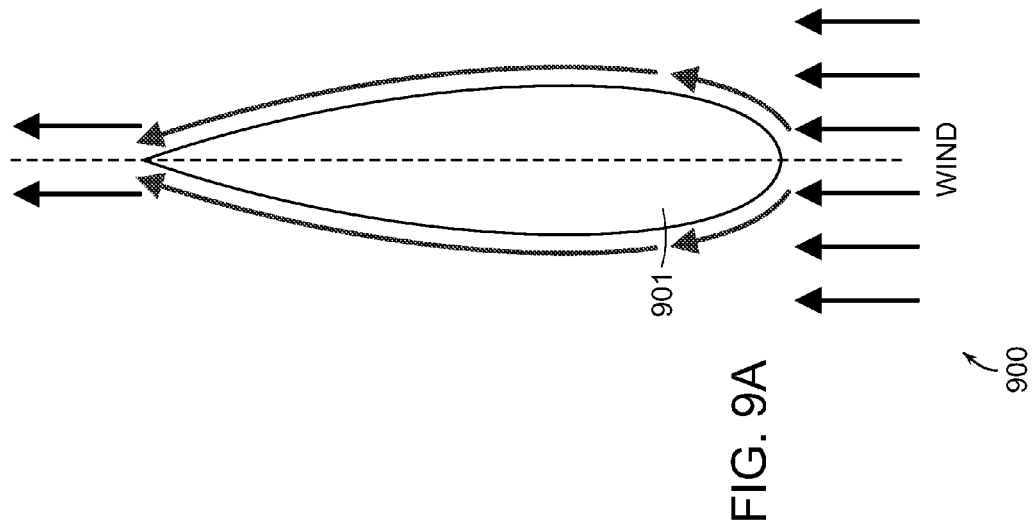

FIGS. 9A-9B show vertical cross-sections of a blade in accordance with an embodiment of the invention. The wind 900 is incidental to the leading edge 902 of a blade. The blade is symmetrical on both sides in this embodiment, i.e., both sides of the center line match so that there is equal pressure on both sides of the blade as it moves into the wind. Unlike the Noguchi design, which is asymmetrical, the symmetrical, streamlined shape of the blade in the preferred embodiment of the invention forces air to pass both sides of the blade at approximately the same velocity, thereby minimizing lift and reducing the resistance that is inherent in asymmetrical blades, as shown in FIGS. 1A, 2A and 3A. The trailing edge 903 of the blade includes a rear-facing scoop to capture wind and use its force to propel the blade into motion, similar to the concept of a weathervane cup. The scoop area 904 is where the wind is captured as it passes through the blades diameter. The area 905 is an impenetrable reinforced "U" tube that acts as a wall where the energy of the wind collides, creating forward momentum. Once the system is in motion, the "scoop" is very effective in sustaining the momentum of the rotation, much the same way as a playground merry-go-round. This additional wind capture equates to faster start up as well as better rotation due to the additional force of the wind being captured. In FIG. 5, the rotational speed 501 of a blade is depicted as a function of wind conditions 502 showing that significant rotation occurs even for wind speeds as low as 5.0 mph (2.25 m/sec).

In one embodiment, the outer and inner surfaces of the blades are formed in a single or multiple sheet structure as a rounded symmetrical shape along the width and height of the blades. This creates a smaller "stagnation" point as the leading edge of the blade meets the wind, which reduces resistance and retains the inertia of forward momentum for a longer period of time.

FIGS. 10A-10D show a top view of the different phases of this merry-go round type revolution as the blades interact with the wind 1004. In FIGS. 10A-10B, the wind pushes at the rear of a scoop 1001, propelling the blades in clockwise rotation. In FIG. 10C, the same blade has rotated 180° and is now facing into the wind that its leading edge acts to minimize the drag forces. As the blades continue to rotate, at least one of the blades is situated to capture the force of the wind. This system is effective in turbulent wind conditions and does not need to change directions to meet the wind or be fixed pointed in any particular direction.

Figures 11A, 11B, 11C, 11D:
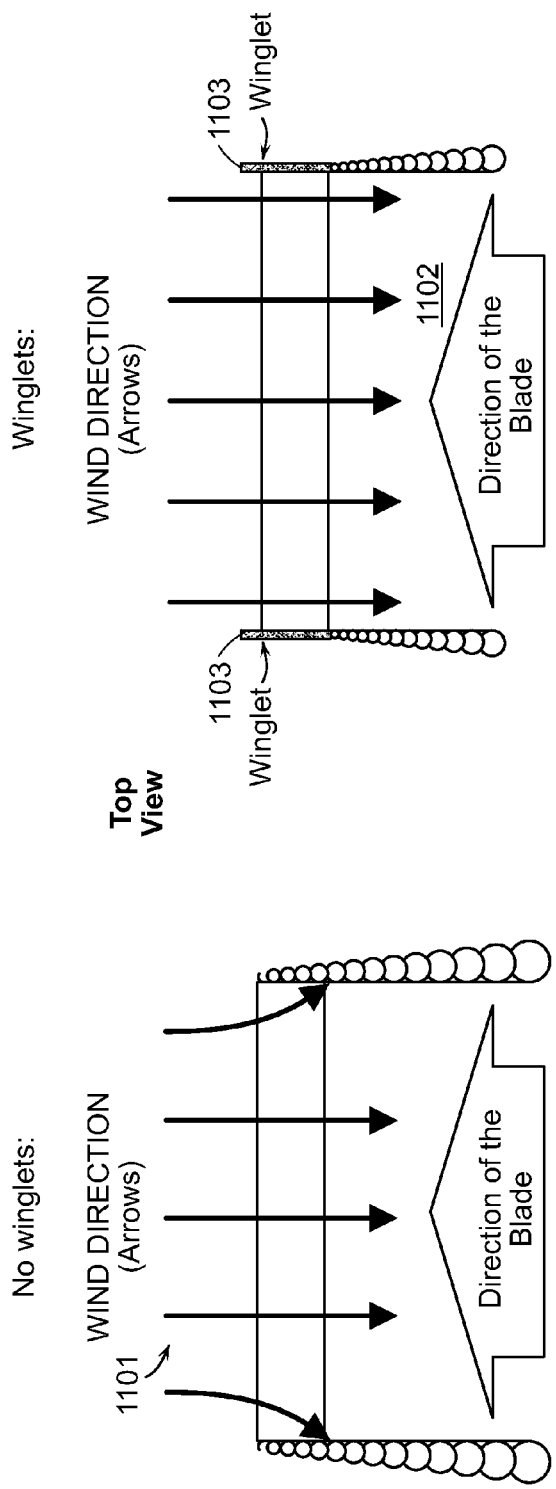
FIGS. 11A-11B are top and front schematic views of an illustrative windmill blade with no winglets in accordance with an embodiment of the invention.
FIGS. 11C-11D are top and front schematic views of an illustrative windmill blade with winglets in accordance with an embodiment of the invention.

As shown in FIGS. 11A-11B, turbulent vortex shedding is created at the ends of the blades 1101 and 1102, which results in drag. FIGS. 11A-11B show an a blade without winglets. When the blade in FIGS. 11A-11B rotates and cuts through the wind, an unsteady separation of airflow causes swirling vortices 1107 at the end of the blade. By adding winglets 1106 to the end of the blade, as shown in FIGS. 11C-11D, the wind flow is channeled and swirling vortices are reduced. The winglets can reduce vortex shedding by up to 4-7%. The reduction of swirling vortices also reduces drag and noise The winglet design may have several shapes or sizes, which are determined by the area affected by the turbulence. For example, the winglet shown in FIG. 12 has the shape of an airfoil. This winglet is designed to be asymmetrical to create lift and reduce friction caused by gravity. Specifically, the design leverages the Bernoulli principle to cause lower pressure on the upward facing side of the winglet. The pressure difference between the upper and lower faces of the winglets create upward lift, parallel to the axis of rotation. Consequently, the winglets act on the blades 1202 to reduce the force of gravity against the bearings 1205, thus improving the rotation due to there being less downward friction. Depending upon the optimum width, winglets can increase the wind capture area by as much as 20% or more per blade. For example, a 12 foot blade with 1.5 foot winglets has the wind capture of a 15 foot blade for better start. This airfoil winglet design in combination with the symmetrical blade design and scoop design creates further efficiencies of rotation.

While the blade may be depicted with three or four blades, one of ordinary skill in the art would recognize that fewer or additional blades could be added. FIGS. 24A-D show configurations in which the windmill has 2, 3, 4, and 5 blades respectively. In one embodiment, each blade is formed from a rigid material, such as aluminum, tungsten, plastic or resin, but can also be made using soft materials with great strength such as Kevlar, BoPET (Biaxially-oriented polyethylene terephthalate), or other synthetic materials including carbon fiber frames. Each blade is parallel with a rotating shaft along a direction of a circumference of the same radius in a face orthogonal to the rotating shaft extended in a vertical direction.

In one embodiment, one or more spars or support beams 707 are inserted to fit into each blade and the support beams are attached to upper and lower faces of the blade respectively to prevent the blade from being deformed during rotation. In this example, the support beam extends radially from the rotating shaft. As a result, rotation of the blade is transmitted to the rotating shaft 708. In another embodiment, the shaft has blades supported in a cross section extending from a generator, which reduces overall weight and is effective for smaller systems with generators under 10 kilowatts (kw).

While most blade designs have wind cut-in speeds of 4+ meters per second or higher, the blade design in an embodiment of the invention can begin rotating with wind speed under 2.0 meters per second, has cut-in speeds at under 2.3 m/s, and attains maximum rotation speeds for a given wind speed that is twice that of a Bernoulli-based blade. The sooner the system attains its maximum rotation speeds the more energy it produces over its extended life.

In one embodiment, one or more portions of the windmill described herein may be coated with something to help clean themselves and the air around it. The treated area acts as a catalyst to break down organic pollutants on its surface and in the air around it in the presence of sunlight. Once broken down, rainwater simply rinses them away. An example coating is HYDROTECT manufactured by TOTO, Ltd., of Kitakyushu, Japan. Coating hydrophilic titanium-dioxide surfaces with HYDROTECT allows for direct and environmental grime to be washed away with a simple rain water or moisture. When HYDROTECT is used on building facades, rain water performs the rinse, lessening the need for polluting detergents, maintenance cleaning and reducing the waste of potable water for cleaning HYDROTECT may even help to successfully reduce air pollution. The chemical reaction on the surface of treated areas removes Nitrous and Sulfuric Oxides from the air which are categorized as a carbon emission by the EPA. A 10,000 square-foot area of HYDROTECT treated area reduces the same amount of air pollution as 70 medium-size deciduous trees. The surface treated with HYDROTECT in a rotating state may act as an ionizer by increasing the amount of pollutants that make contact with the surface of the blades.

Figure 13:
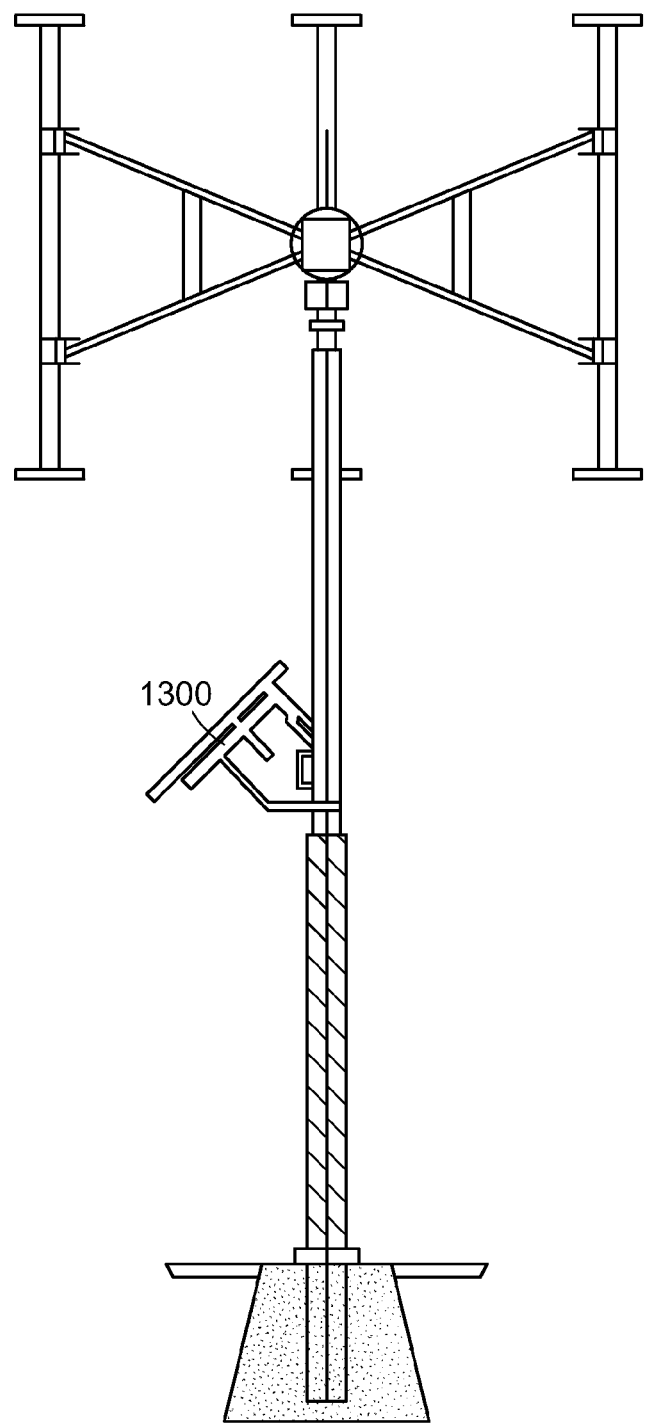
FIG. 13 is a schematic view of an illustrative windmill design with a solar panel coupled to the vertical windmill tower mount in accordance with an embodiment of the invention.
Figure 14:
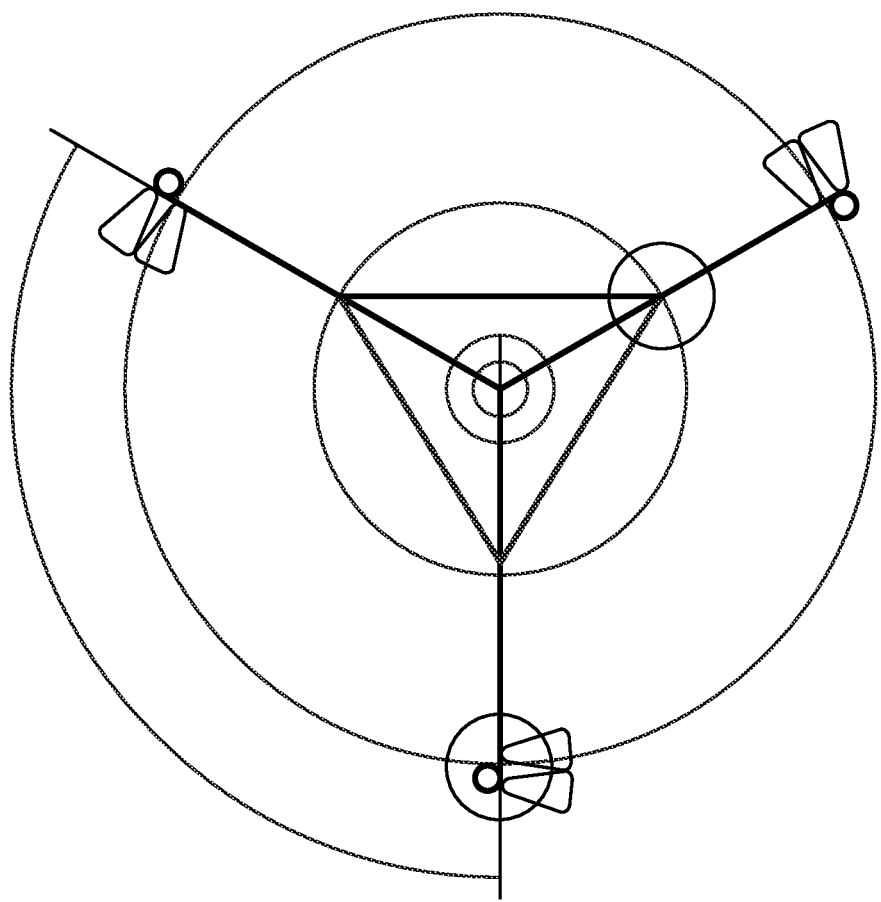
FIG. 14 is a top schematic view showing the wind blade radius plan of the windmill design in FIG. 13.

In an embodiment of the invention, a small or a middle-sized windmill blade can be fabricated inexpensively and easily. The vertical shaft windmill may contain add-ons, such as, advertisement banners, solar photovoltaic panels 1300 as in FIG. 13 with or without tracking, video cameras, cell transmitters and so forth. A top view is displayed in FIG. 14. These combinations reduce costs compared to building a stand-alone solar photovoltaic panel, for example, because the costs to build a tower are already covered by economic benefits from the wind power generated.

Figure 15:
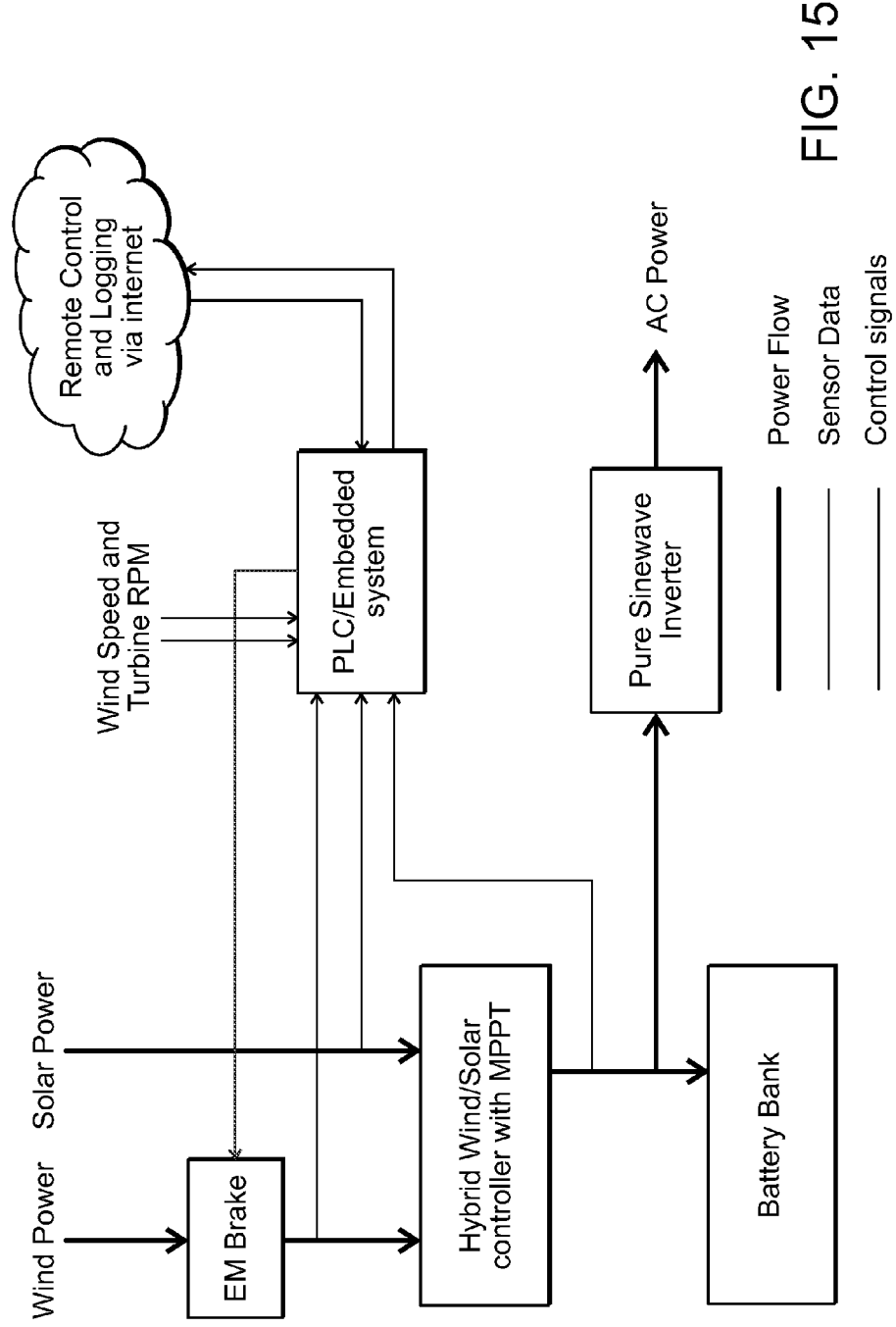
FIG. 15 is an electrical block diagram showing an illustrative configuration for driving electrical load from captured wind and solar power in accordance with an embodiment of the invention.

In one embodiment, the wind turbines are connected to an electrical generation and rectification system, as described in FIG. 15 where a windmill and solar photovoltaic panels are combined using a maximum power point tracking device, an inverter, and a brake unit, together with remote control and data logging accessible via the internet or other bidirectional communications. The system can be configured for grid tie or off grid application. FIGS. 16A-B show illustrative wind turbines in accordance with an embodiment of the invention that are scaled to be used in Megawatt MW scale wind mills. The advantages of the VAWT using an embodiment of the invention is that it can be designed to be more stable than horizontal structures Multiple support columns 1601 can be used to support the system and unlike a horizontal structure the blades can be stabilized vertically north-south 1602. The overall structural stability that results from this design may allow for it to be re-used in future generation deployments. The design allows for the generator 1603 to be placed at or near the bottom of the structure for easier/lower cost maintenance. Because of the high torque nature of the invention blade, a large wind mill of this design can be placed at a lower height to be efficient.

Figure 17:
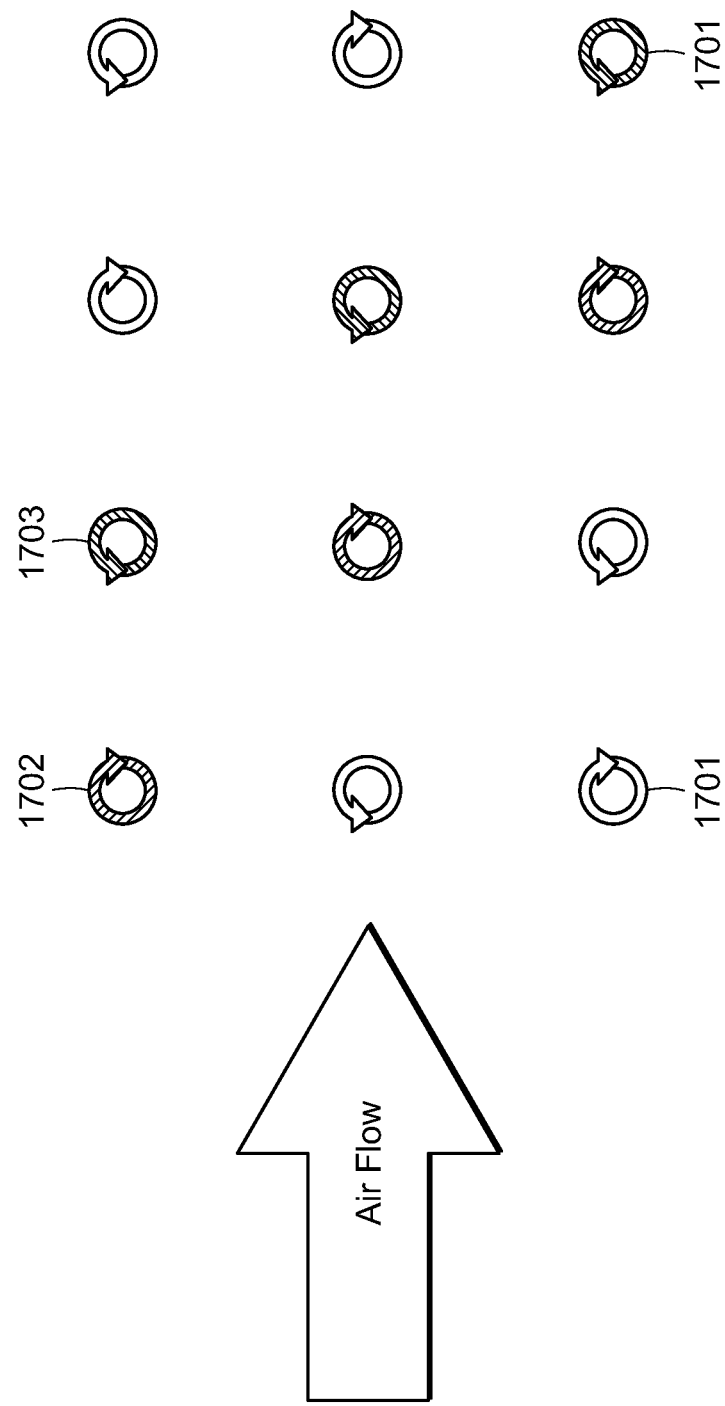
FIG. 17 is schematic configuration of multiple windmills deployed in a tight formation in accordance with an embodiment of the invention.

FIG. 17 illustrates a study conducted by Professor John Dabri from Caltech released in 2010-2011, which showed that vertical axis wind mills can be placed in tight configurations spinning clockwise 1702 and counter clockwise 1703 and that the power of the air flow 1701 between the first rows and the rows further back did not lose strength. The ability to use this tight configuration for micro windmills under 50 kw or for commercial scale wind mills with 1, 2 or 3 MW turbines means that more power can be produced using smaller amounts of real estate. Horizontal wind mills are not capable of being placed in this configuration because the air flow strength exiting the blades is severely diminished. As a result horizontal wind mills are required to be placed large distances apart and side to side horizontally for optimal performance.

Figure 18A:
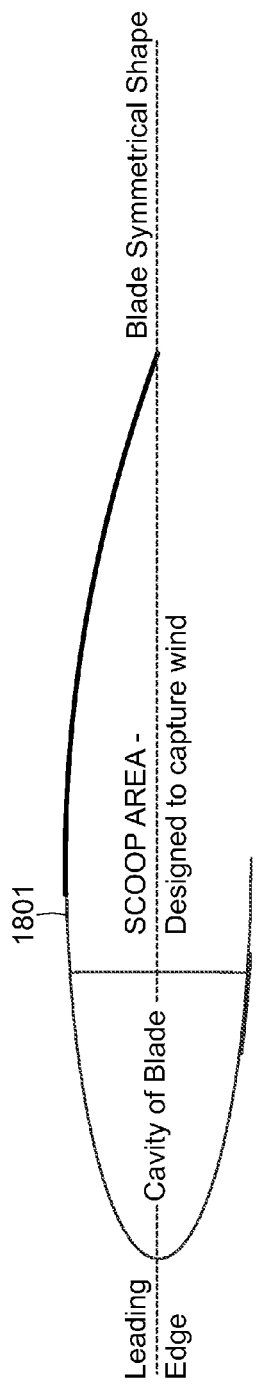
FIGS. 18A-18B are cross-sectional schematics of an illustrative windmill blade with synthetic jet actuators in accordance with an embodiment of the invention.
Figure 18B:
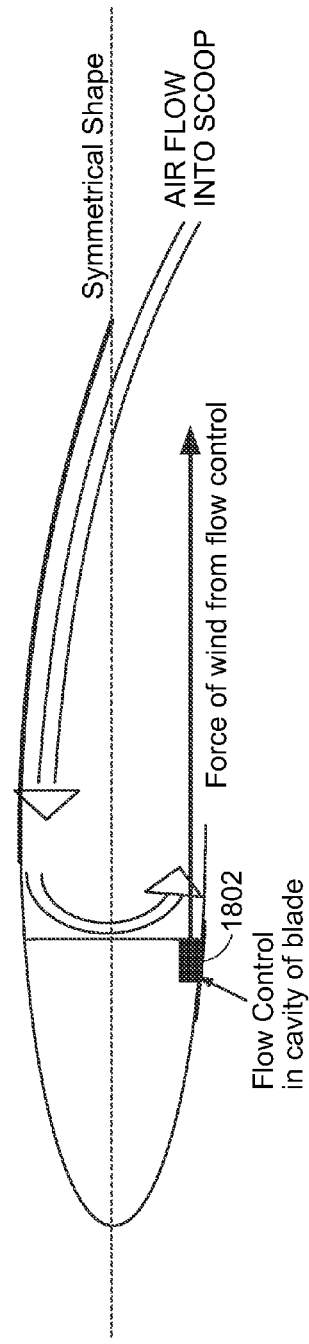

FIGS. 18A-18B illustrate how flow control can be integrated into an embodiment of the invention using highly efficient synthetic jet actuators (SJA), or some other flow control actuator, in the overall design of the blade. Currently these actuators are the size of a typical pack of cigarettes, extremely lightweight, capable of releasing air forces equivalent to 400 miles an hour, and use power which is measured in the low single digits in terms of wattage. 1801 shows a side view of the blade design while 1802 shows the placement of SJAs embedded into the cavity of the leading edge of the blade. The position of the SJA may change and be used to affect the flow of the air as shown.

FIGS. 19A-19B show evenly distributed arrays of SJA that are tied into a mini controller(s) that are then wired to 1901 thin tile style solar panels that are attached to the outer surfaces of the blade. The solar panels may also be used to power any other device that uses electricity to operate which can be mounted on the surface or in the cavity of the blade, this may include the SJAs, an OLED, LED lights, power/battery storage, turbine or weather monitoring equipment etc. 1902 shows the SJA and the mini controllers embedded into the cavity of the blades. As a result the components are protected from the elements, while not creating drag.

Figure 20:
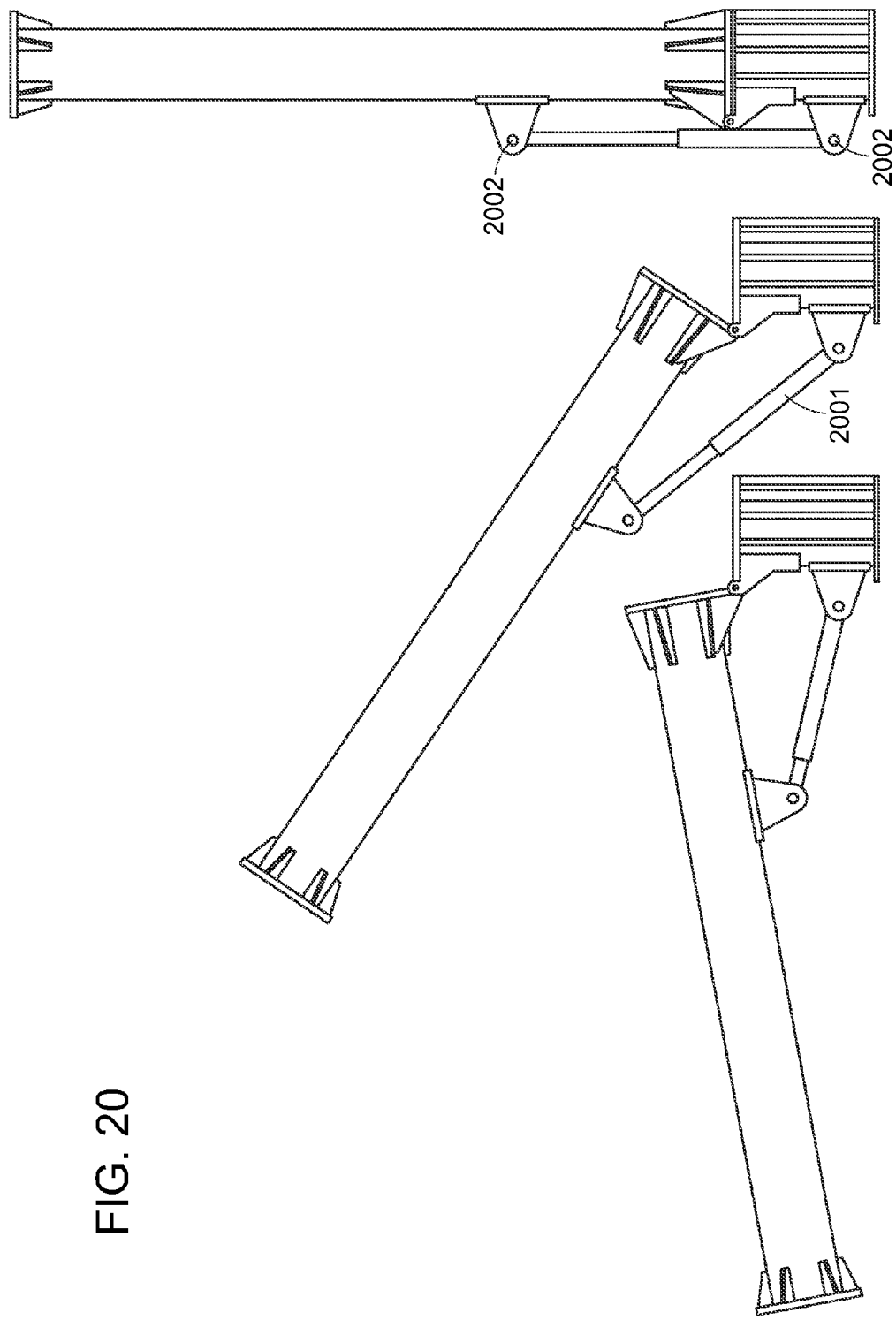
FIG. 20 is a schematic for an illustrative hydraulic tower with a hydraulic arm to erect and collapse the tower in accordance with an embodiment of the invention.

FIG. 20 shows an embodiment of the invention that uses a hydraulic tower and hydraulic arm 2001. The hydraulic arm 2001 is attached (and can be detached once the tower is raised) to the tower on removable or permanently attached hinges 2002. Once attached, the tower can be raised or lowered in under 10 minutes. This eliminates the need for a costly crane to lift the tower and allows for installations in remote terrain. The system is good for hurricane, cyclone, typhoon locations where the systems can be quickly lowered in advance of storms.

Figure 21:
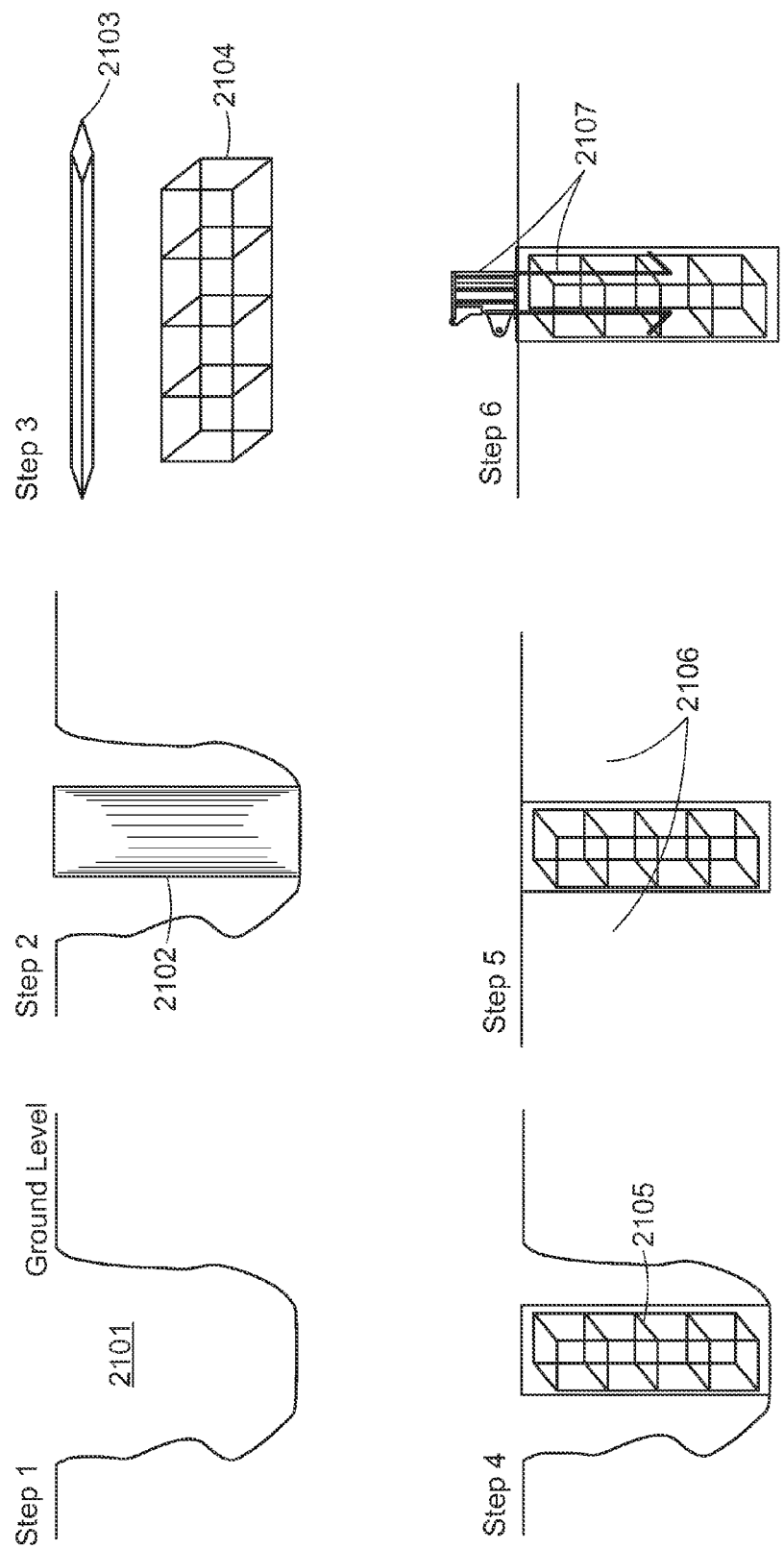
FIG. 21 shows illustrative steps for installing a pre-cast foundation and pre-built rebar system in accordance with an embodiment of the invention.
Figure 22:
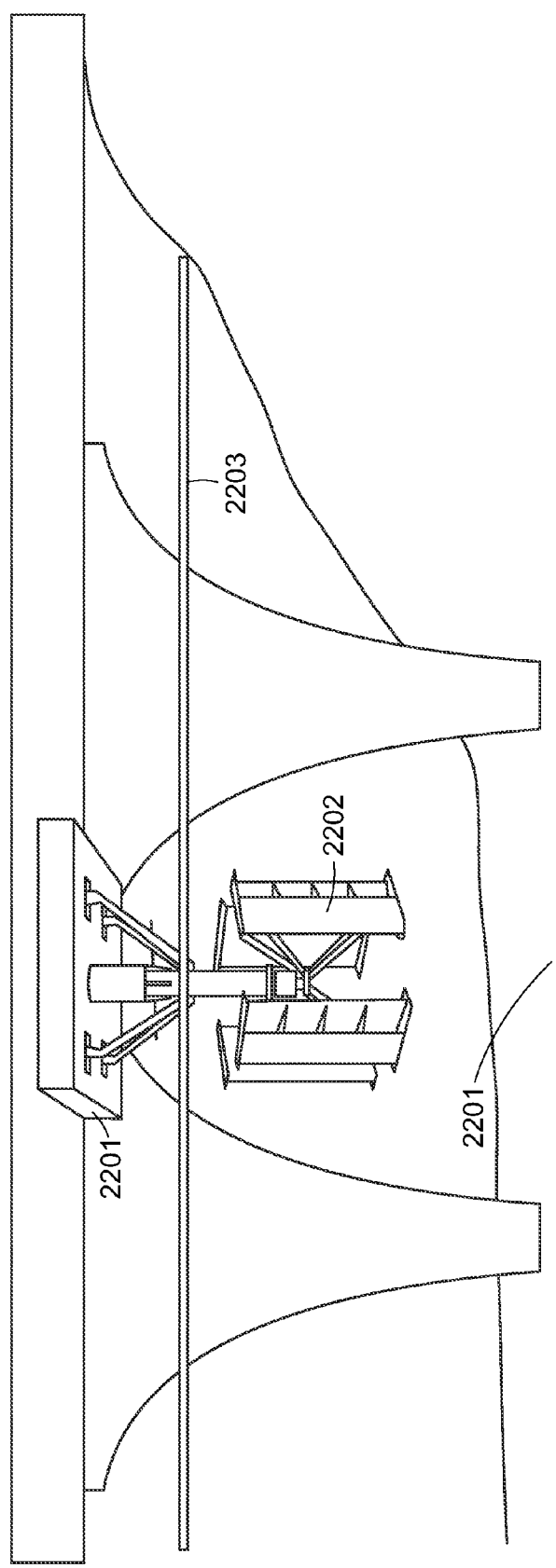
FIG. 22 shows an illustrative underwater application for the windmill in rivers and tidal areas in accordance with an embodiment of the invention.

FIG. 21 shows the process for installing the tower in accordance with an embodiment of the invention. A biodegradable lightweight sonotube 2102, or something similar, is placed inside a hole 2101 to form concrete and shape the foundation for the tower. To save material costs, labor and time, a pre-designed foldable rebar system 2103 and 2104 can be placed inside the Sonotube, as shown in Step 4. The area surrounding the Sonotube is then backfilled as shown in Step 5. Then the tower base plate or base with anchors 2107 is placed on the Sonotube, secured and the concrete is poured. This entire process can be reduced to under 30 minutes, excluding time to dig the hole which varies by soil conditions. This process ensures consistency of foundations, eliminates time consuming labor costs to custom build the forms and rebar.

One of ordinary skill in the art would recognize that the windmill design in the preferred embodiment of the invention can be utilized in another environments and applications, and is not limited to wind power generation. For example, FIG. 17 shows an application of an embodiment of the invention in a river or tidal flat, where the system can be suspended from a bridge 1701, a pier or foundation anchored to the bottom, or both. The system would be placed with a plurality of blades in a vertical axis in the water. A generator may be placed above the waterline 1703 or in the water. The same scientific principles for the blades and vertical axis system that apply to air also will apply to water in terms of flow dynamics. As the scoop will capture the high torque power of moving water, the materials used to manufacture the blade and structure would be hardened steel that is treated for rust prevention or painted.

Figure 23:
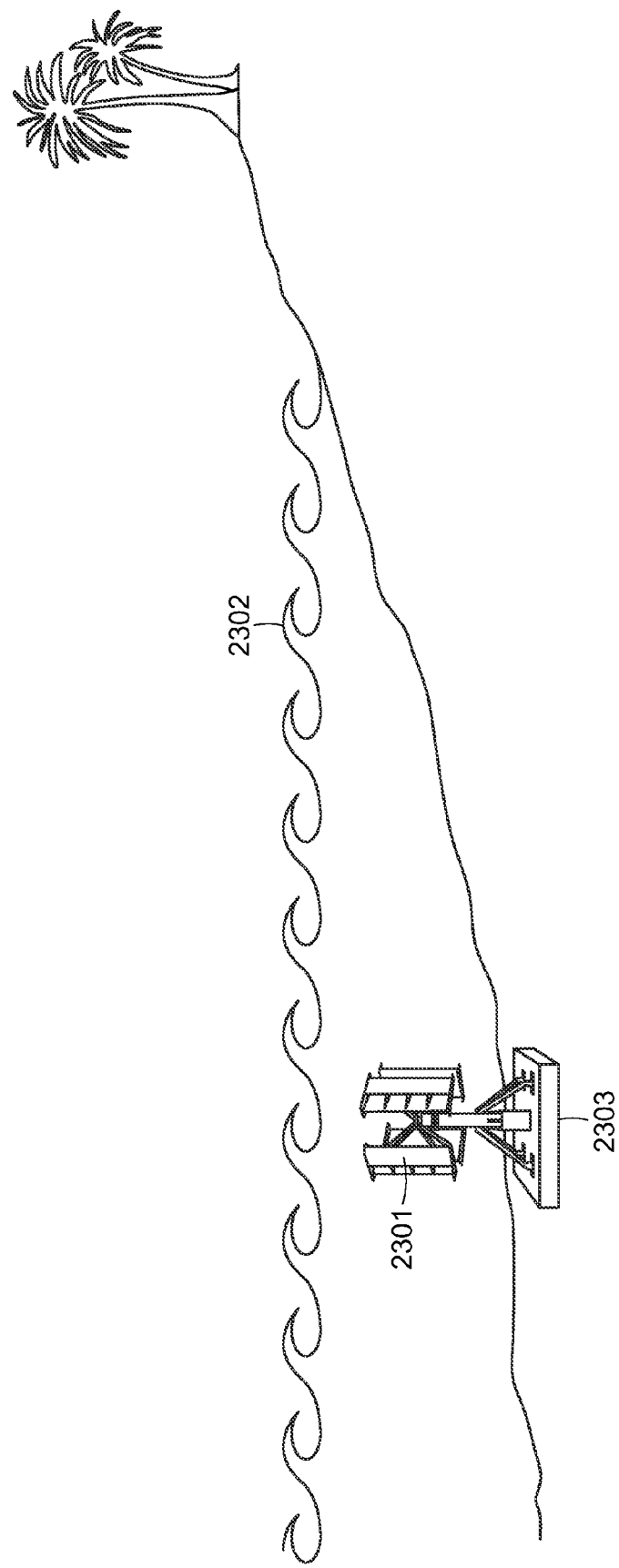
FIG. 23 shows an illustrative underwater application for the windmill using wave action in accordance with an embodiment of the invention.

FIG. 23 shows another application of an embodiment of the invention that is positioned along open shoreline or ocean fronts and uses waves to rotate the system. The blades 2301 are placed vertically below or near the waterline 2302 and can be anchored 2303 into the ocean bed. The generator can be above or below the waterline depending upon the foundation or support structure. As the waves advance and recede, the same scientific principles that apply to air, apply to water in terms of flow dynamics as the blades rotate along a vertical axis.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here.

It will be understood that the foregoing is only illustrative of the principles of the invention, and that various modifications can be made by those skilled in the art without departing from the scope and spirit of the invention.

The invention claimed is:

1. A windmill comprising:
 a shaft that rotates around a vertical axis;
 a plurality of blades, each blade having symmetrical shape along a width and height, each blade having a first end and a second end connected by a top surface and bottom surface, said top surface and said bottom surface terminating at a rounded front edge to enable air to flow across the top surface and the bottom surface at a same speed, and a rear edge, each of said plurality of blades including wind scoop portion formed at a rear end portion of a lower face of the blade, and spanning a predetermined length of said blade, the wind scoop portion of each blade facing inward or outward from the rotating shaft, said plurality of blades vertically positioned at an outer periphery of said rotating shaft; and
 a plurality of arms, wherein at least one of each of said plurality of arms connects at least one of each of said plurality of blades to said rotating shaft, each one of the blades parallel to a plane of rotation around the vertical axis to eliminate a lift away from a center of rotation.

2. The windmill of claim 1, wherein each of said plurality of blades includes at least one winglet coupled to at least one of said first end and said second end.

3. The windmill of claim 2, wherein said at least one winglet has an asymmetrical shape.

4. The windmill of claim 1, wherein each of said plurality of blades includes at least one winglet integrated to said blade at at least one of said first end and said second end.

5. The windmill of claim 1, wherein said plurality of blades are configured to have a cut-in speed of less than 2.3 meters/second.

6. The windmill of claim 1, wherein said plurality of blades are attachably coupled to said rotating shaft so that at least one of said plurality of blades can be added or removed from said rotating shaft in response to changing wind conditions.

7. The windmill of claim 1, wherein at least one of said plurality of blades comprises a plurality of solar panels.

8. The windmill of claim 1 wherein at least one of said plurality of blades comprises at least one flow control actuator.

9. The windmill of claim 1, further comprising at least one hydraulic arm, said hydraulic arm configured to automatically erect and collapse said rotating shaft in response to changing wind conditions.

10. A method of using windmill, said method comprising the steps of:
- installing a shaft that rotates around a vertical axis;
- attachably coupling a plurality of arms circumferentially around said rotating shaft, each of said plurality of arms having a first end and a second end, said first end being attachably coupled to said rotating shaft;
- attachably coupling a plurality of blades to said plurality of arms, each blade having symmetrical shape along a width and height, wherein each of said plurality of blades is attachably coupled to at least one of said plurality of arms, said plurality of blades having a first end and a second end connected by a top surface and bottom surface, said top surface and said bottom surface terminating at a rounded front edge, and a rear edge, said plurality of blades vertically positioned at an outer periphery of said rotating shaft parallel to a plane of rotation around the vertical axis to eliminate a lift away from a center of rotation;
- providing a wind scoop portion on each of said plurality of blades to capture wind, said wind scoop portion formed at a rear end portion of a lower face of the blade and spanning a predetermined length of said blade, the wind scoop portion of each blade facing inward or outward from the rotating shaft; and
- distributing air flow across said top surface and said bottom surface of said plurality of blades to maintain a same air pressure at said top surface and said bottom surface.

11. The method of claim 10, further comprising coupling at least one winglet to at least one of said first end or said second end.

12. The method of claim 11, wherein said at least one winglet generates lift in a direction parallel to said rotating shaft to offset friction caused by weight of said plurality of blades.

13. The method of claim 11, wherein coupling said at least one winglet to at least one of said first end or second end reduces at least one of turbulent vortex shedding, aerodynamic drag, and noise.

14. The method of claim 10, further comprising integrating at least one winglet into at least one of said first end or said second end.

15. The method of claim 10, further comprising generating usable power when wind speed is at least 2.3 meters/second.

16. The method of claim 10, further comprising coupling a plurality of solar panels to at least one of said plurality of blades.

17. The method of claim 10, further comprising coupling at least one flow control actuator to at least one of said plurality of blades to propel said plurality of blades.

18. The method of claim 10, further comprising automatically erecting or collapsing said rotating shaft with at least one hydraulic arm.

* * * * *